US012095180B2

(12) United States Patent
Hwang et al.

(10) Patent No.: US 12,095,180 B2
(45) Date of Patent: Sep. 17, 2024

(54) MULTI-BAND PATCH ANTENNA

(71) Applicant: AMOTECH CO., LTD., Incheon (KR)

(72) Inventors: Chul Hwang, Incheon (KR); Sango Kim, Incheon (KR); Injo Jeong, Incheon (KR); Habin Bong, Incheon (KR); Yechan Choi, Incheon (KR); Injoo Kim, Incheon (KR); Hangyeul Kim, Incheon (KR); Piljung Jeong, Incheon (KR); Hong-Woo Kim, Incheon (KR)

(73) Assignee: AMOTECH CO., LTD., Incheon (KR)

( * ) Notice: Subject to any disclaimer, the term of this patent is extended or adjusted under 35 U.S.C. 154(b) by 231 days.

(21) Appl. No.: 17/638,558

(22) PCT Filed: Aug. 25, 2020

(86) PCT No.: PCT/KR2020/011291
§ 371 (c)(1),
(2) Date: Feb. 25, 2022

(87) PCT Pub. No.: WO2021/040366
PCT Pub. Date: Mar. 4, 2021

(65) Prior Publication Data

US 2022/0311142 A1 Sep. 29, 2022

(30) Foreign Application Priority Data

Aug. 27, 2019 (KR) ........................ 10-2019-0105360

(51) Int. Cl.
*H01Q 9/04* (2006.01)
*H01Q 5/40* (2015.01)
(Continued)

(52) U.S. Cl.
CPC ............. *H01Q 9/0414* (2013.01); *H01Q 5/40* (2015.01); *H01Q 9/045* (2013.01);
(Continued)

(58) Field of Classification Search
CPC ........ H01Q 9/0414; H01Q 5/40; H01Q 9/045; H01Q 1/38; H01Q 1/526
See application file for complete search history.

(56) References Cited

U.S. PATENT DOCUMENTS

2020/0136257 A1 4/2020 Hwang
2021/0066805 A1* 3/2021 Flores-Cuadras ........ H01Q 1/38

FOREIGN PATENT DOCUMENTS

JP 2004-048369 A 2/2004
JP 2004048369 * 2/2004 ............. H01Q 11/08
(Continued)

OTHER PUBLICATIONS

KR Office Action dated Nov. 13, 2020 as received in Application No. 10-2020-0008972.
(Continued)

*Primary Examiner* — Joseph J Lauture
(74) *Attorney, Agent, or Firm* — Maschoff Brennan

(57) ABSTRACT

The present invention suggests a multi-band patch antenna in which an antenna pin is inserted into a single-band patch antenna, so that the multi-band patch antenna requires a minimum mounting space and can resonate in both the existing frequency bands and the V2X frequency band. The suggested multi-band patch antenna comprises: a base substrate through which a first through-hole and a second through-hole are formed; an upper patch and a lower patch arranged on the upper and lower surfaces of the base substrate, respectively; an inner conductor disposed on the inner wall surface of the first through-hole to electrically connect the upper patch to the lower patch; an antenna pin extending through the first through-hole, and including an end part disposed above the base substrate; and a first feed pin extending through the second through-hole.

19 Claims, 36 Drawing Sheets

(51) Int. Cl.
*H01Q 1/32* (2006.01)
*H01Q 1/38* (2006.01)
*H01Q 1/52* (2006.01)
(52) U.S. Cl.
CPC ............. *H01Q 1/3275* (2013.01); *H01Q 1/38* (2013.01); *H01Q 1/526* (2013.01)

(56) References Cited

FOREIGN PATENT DOCUMENTS

| | | | | | |
|---|---|---|---|---|---|
| JP | 2004-312546 | A | | 11/2004 | |
| KR | 10-2005-0101853 | A | | 10/2005 | |
| KR | 10-2011-0005917 | A | | 1/2011 | |
| KR | 10-2011-0089901 | A | | 8/2011 | |
| KR | 10-2012-0032752 | A | | 4/2012 | |
| KR | 10-2014-0095130 | A | | 8/2014 | |
| KR | 10-2016-0100860 | A | | 8/2016 | |
| KR | 10-2018-0104906 | A | | 9/2018 | |
| KR | 20180104906 | A | * | 9/2018 | ........... H01Q 1/3275 |

OTHER PUBLICATIONS

KR Office Action dated May 17, 2021 as received in Application No. 10-2020-0008972.
KR Decision to Grant dated Oct. 25, 2021 as received in Application No. 10-2020-0008972.

* cited by examiner

[FIG. 1]
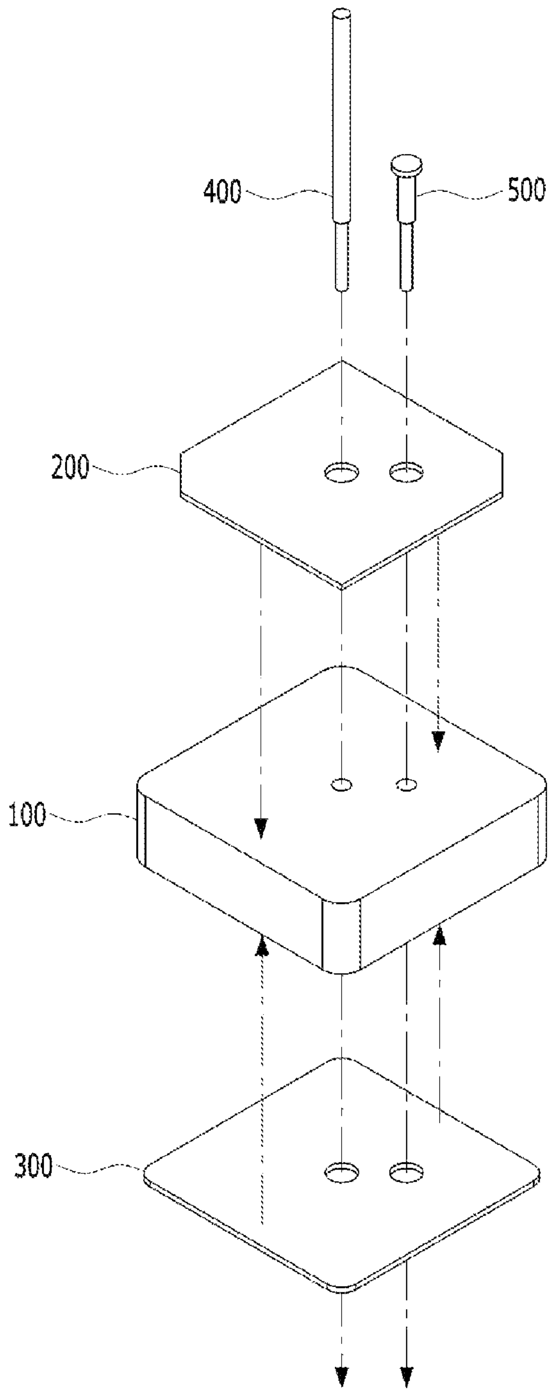

[FIG. 2]
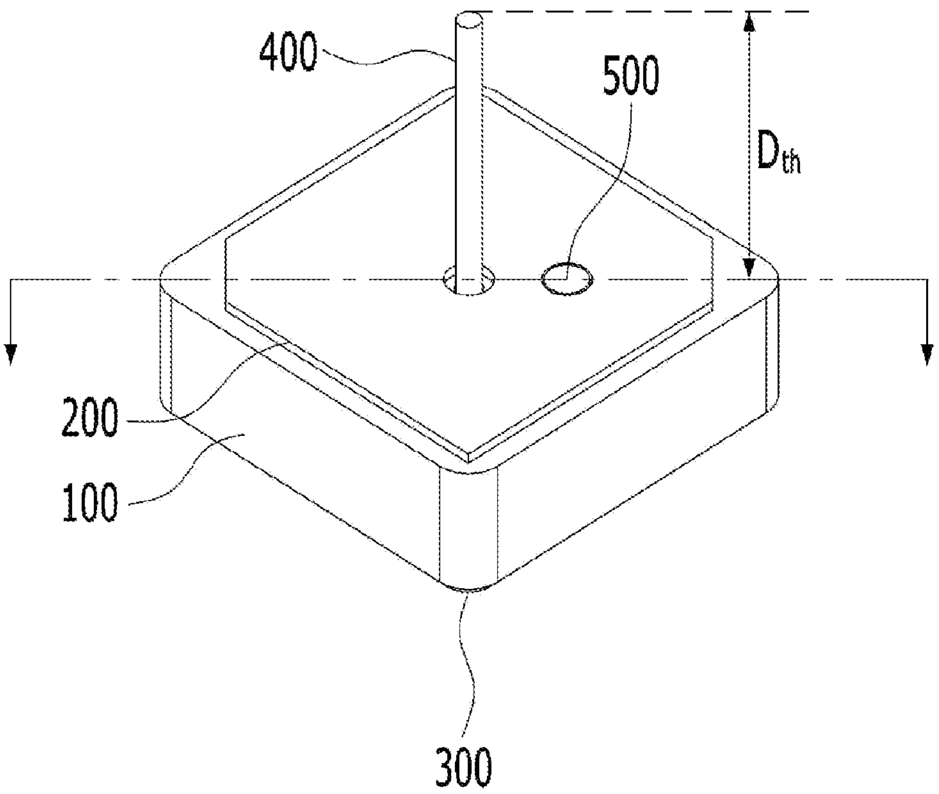

[FIG. 3]
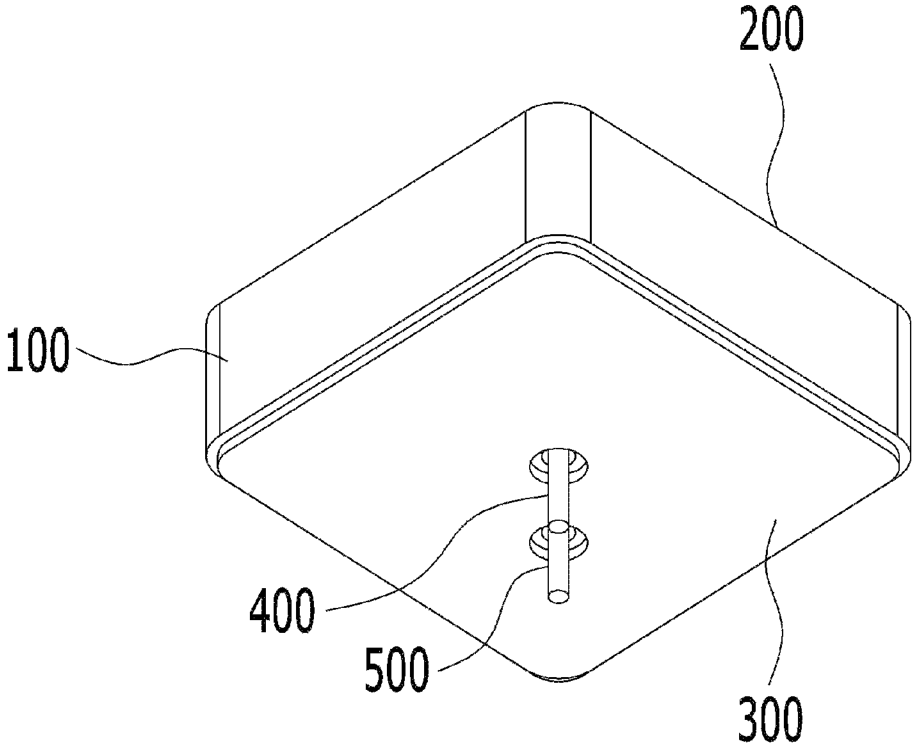

[FIG. 4]
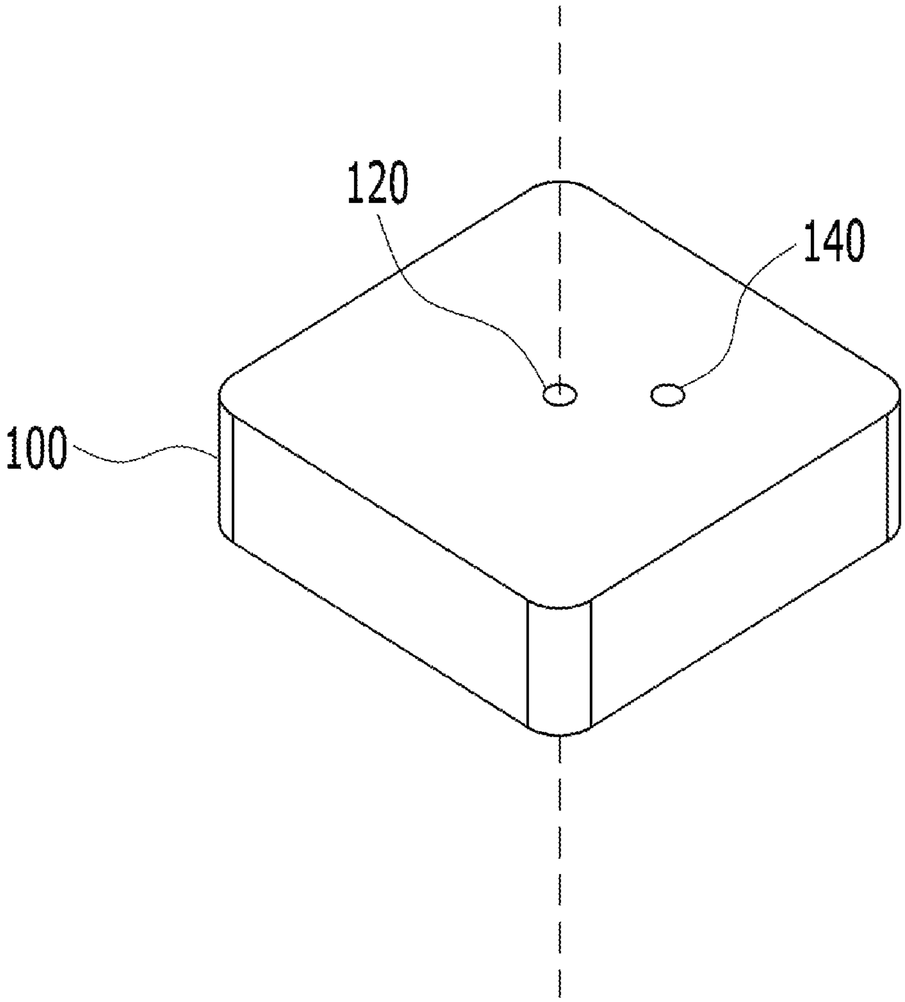

[FIG. 5]
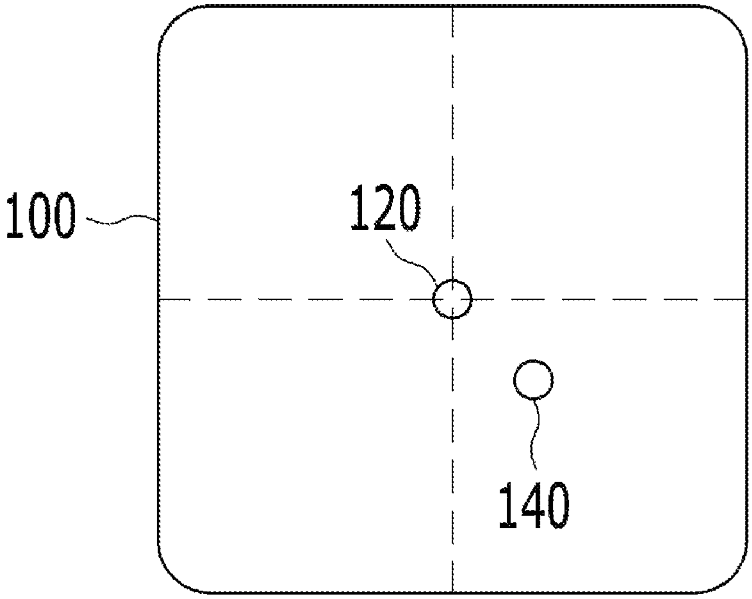
[FIG. 6]
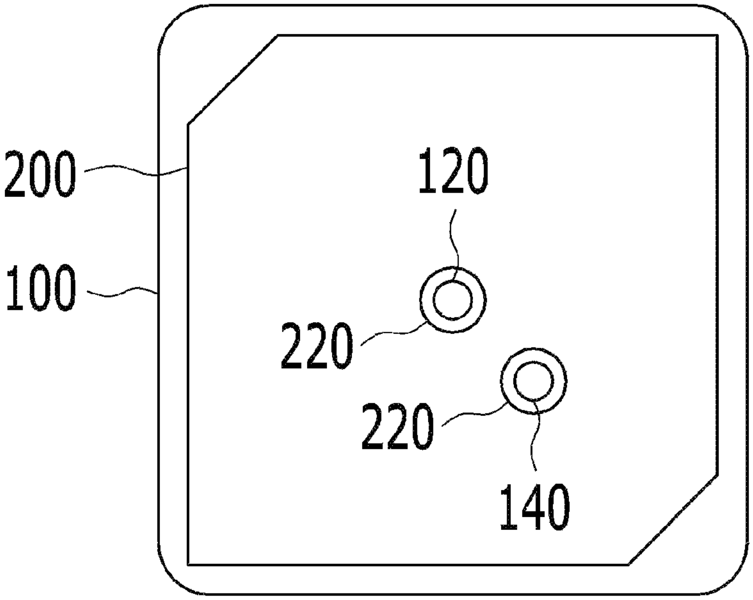

[FIG. 7]
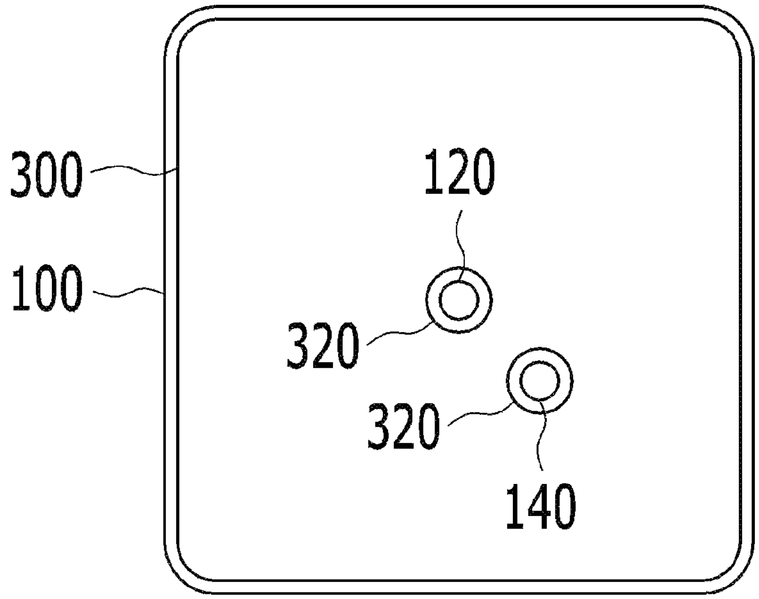
[FIG. 8]
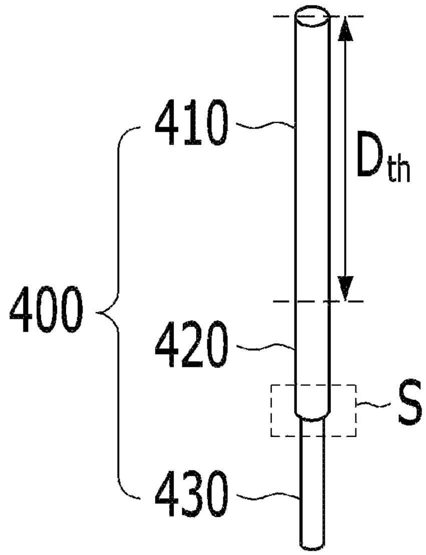

[FIG. 9]
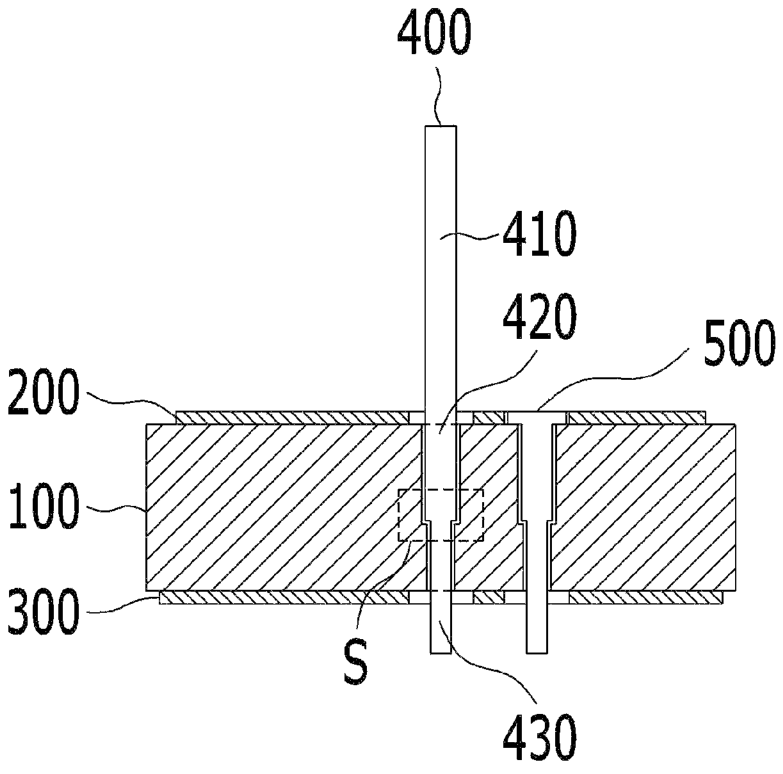

[FIG. 10]
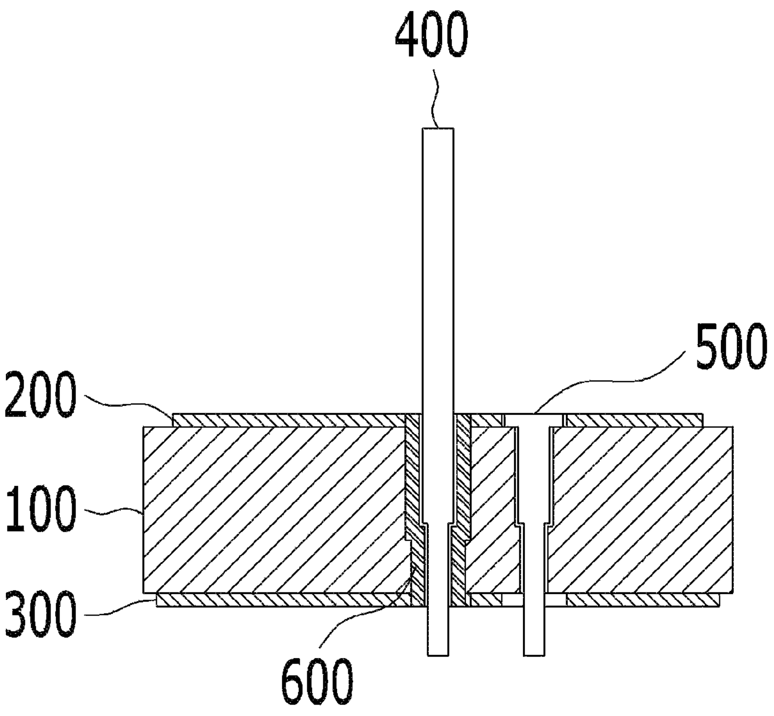

[FIG. 11]
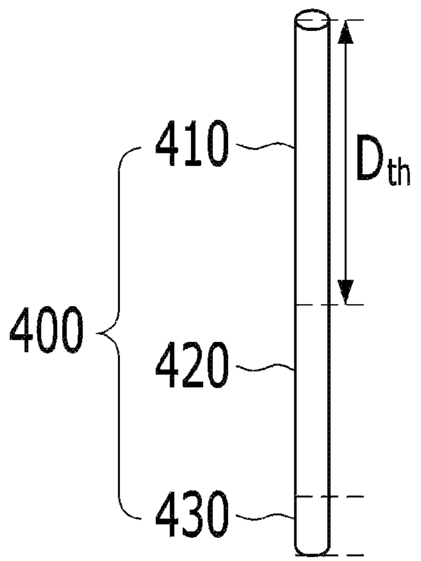

[FIG. 12]
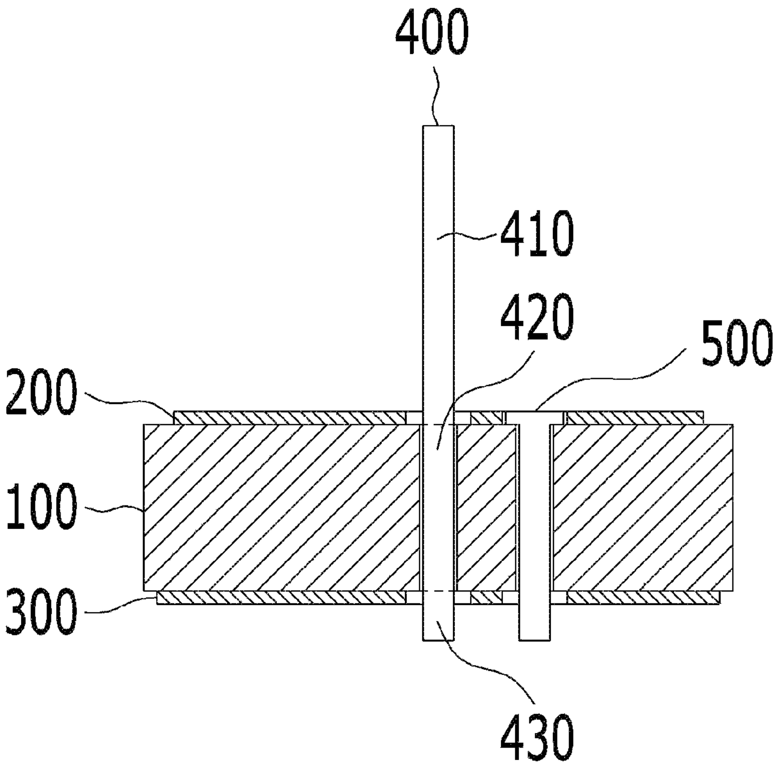

[FIG. 13]
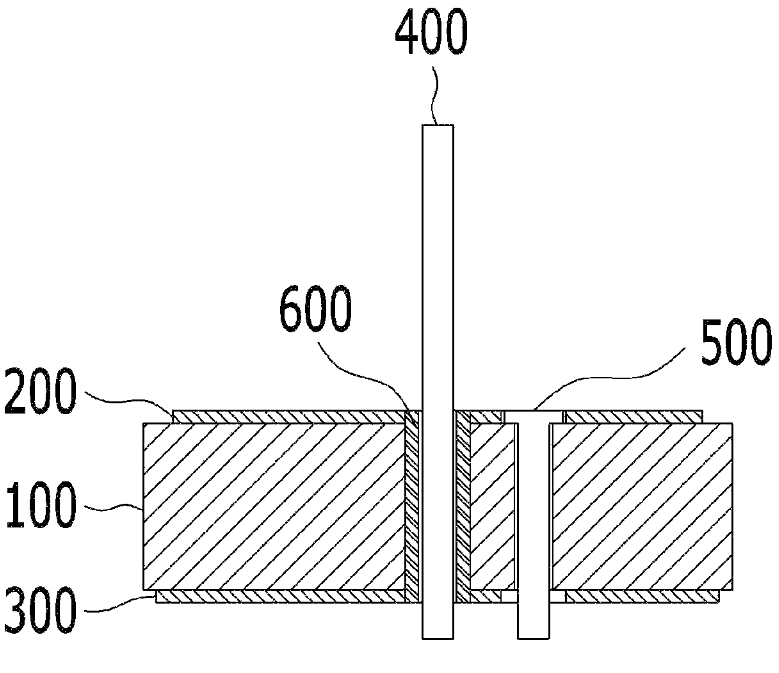

[FIG. 14]
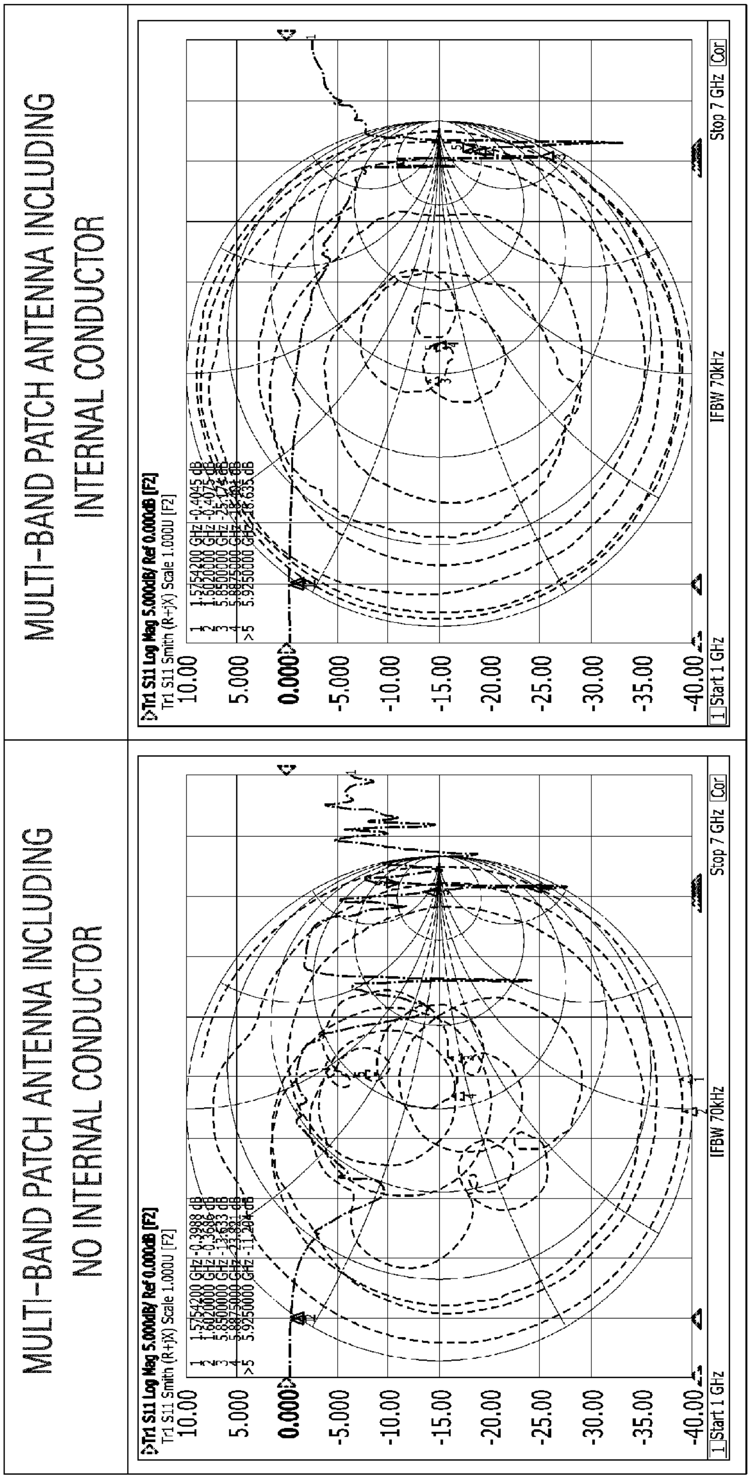

[FIG. 15]
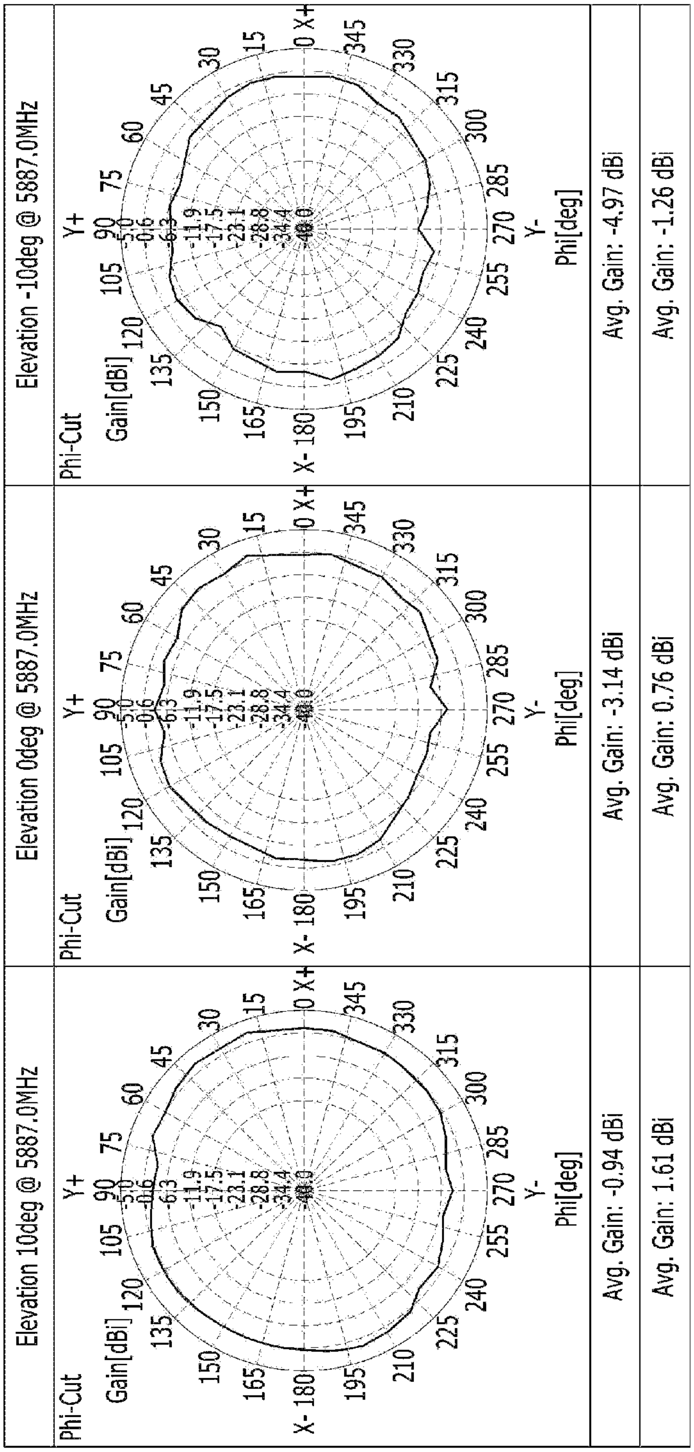

[FIG. 16]
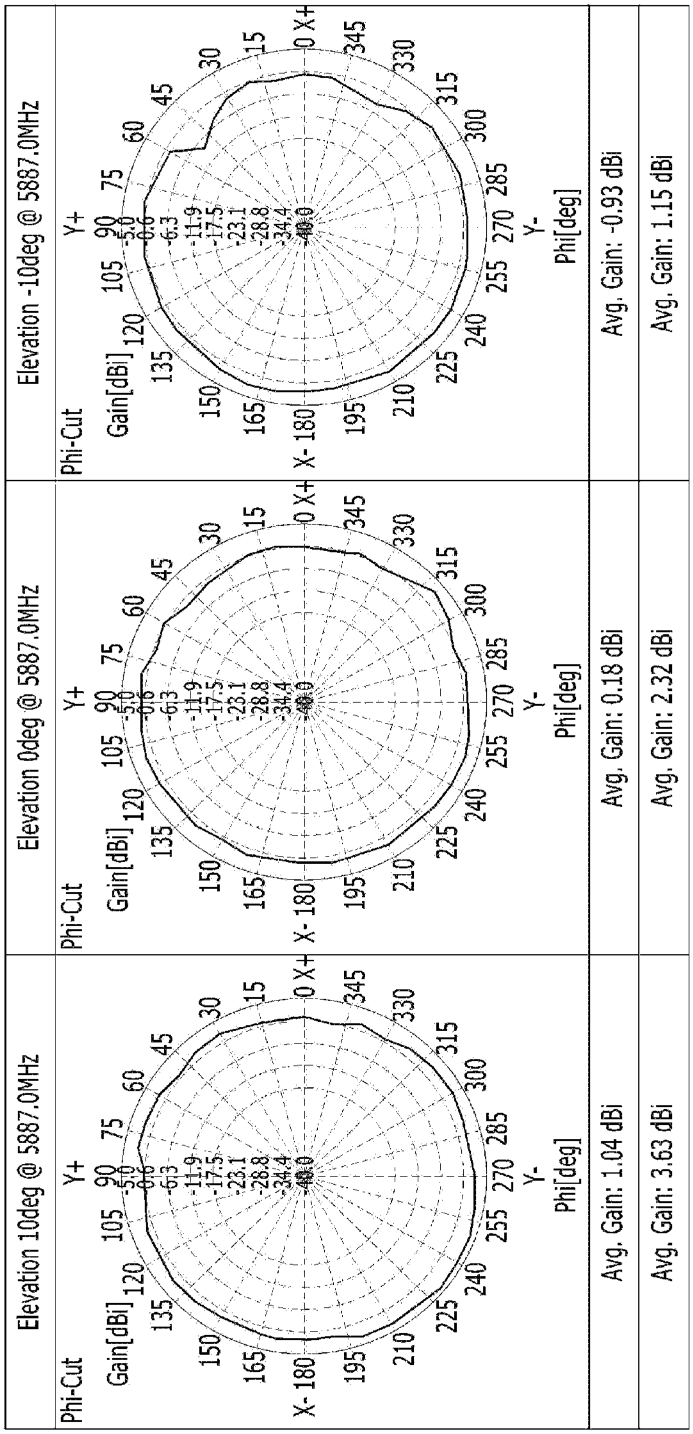

[FIG. 17]
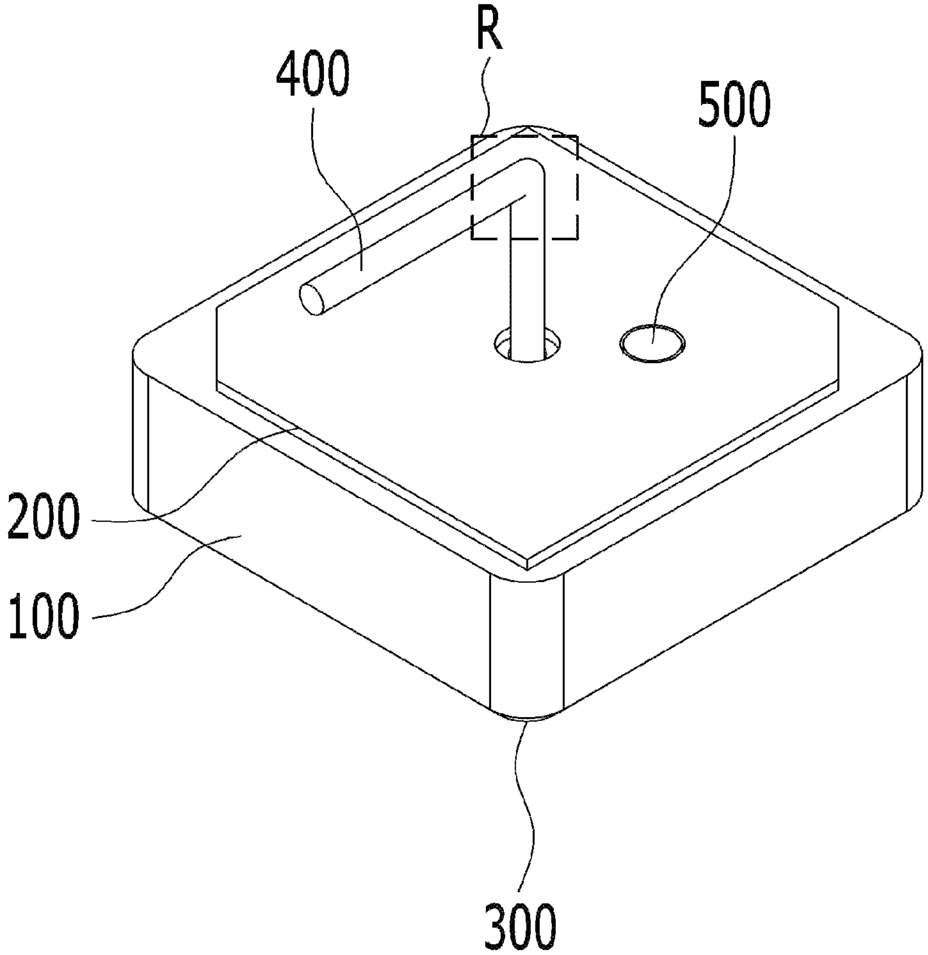

[FIG. 18]
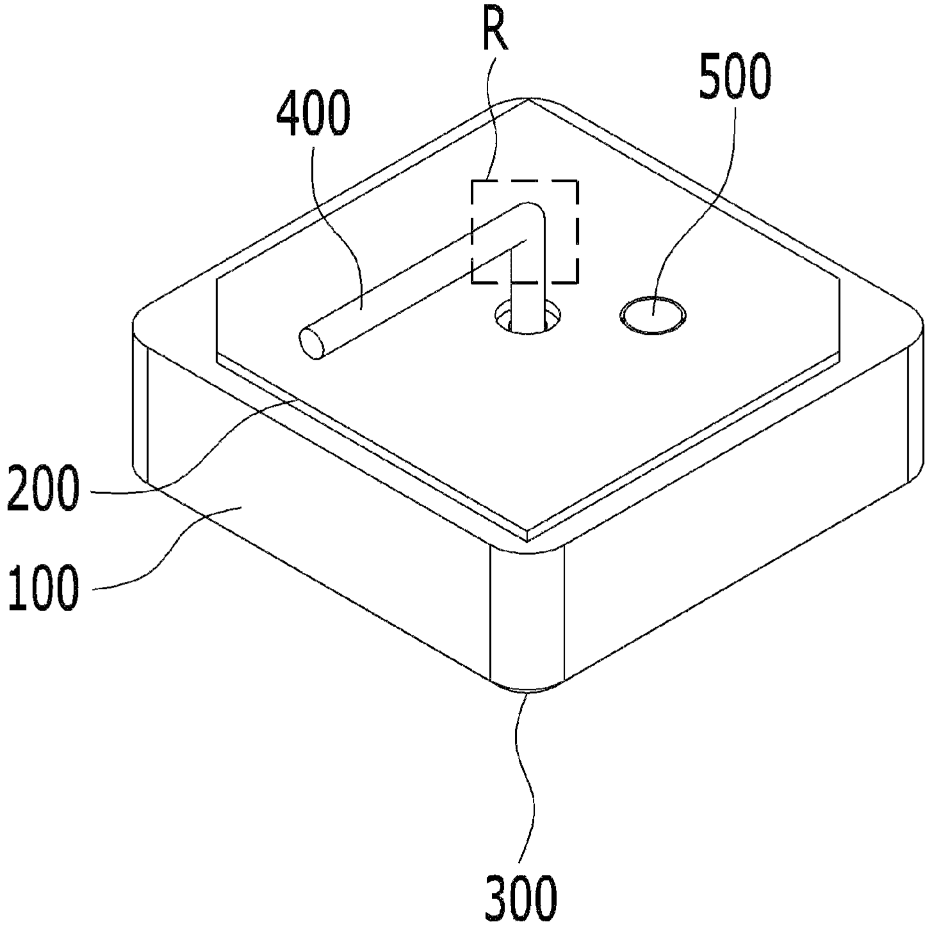

[FIG. 19]
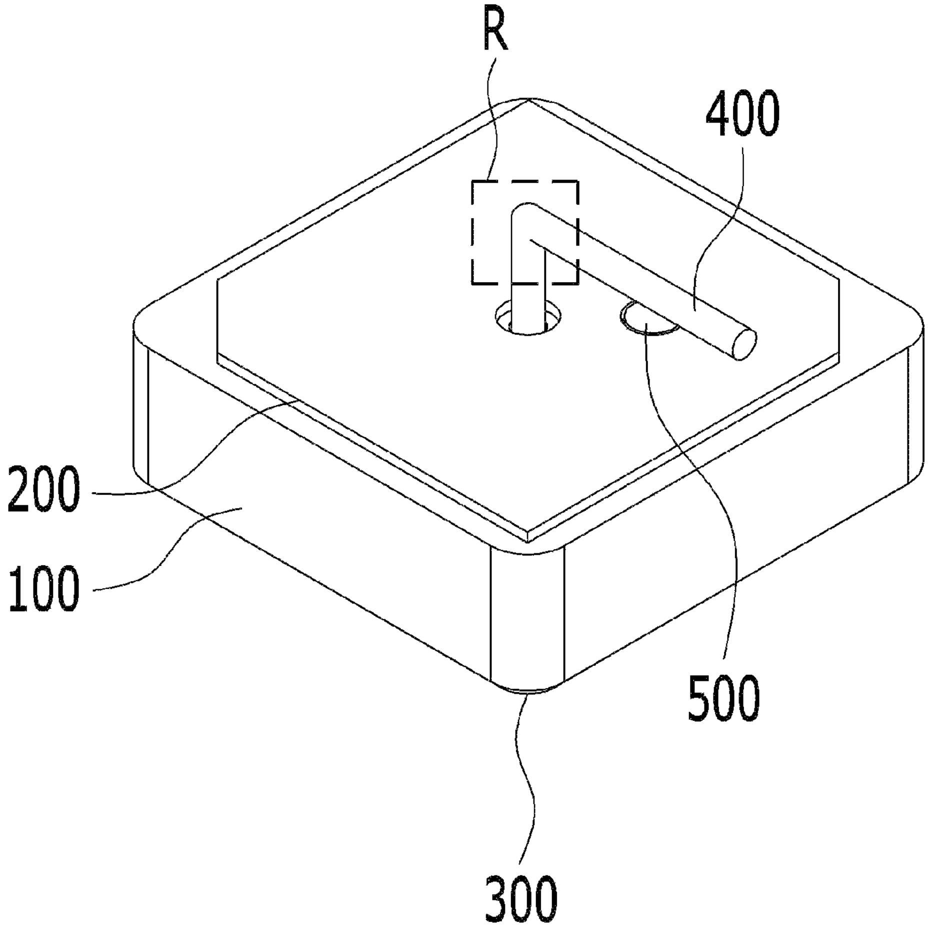

[FIG. 20]
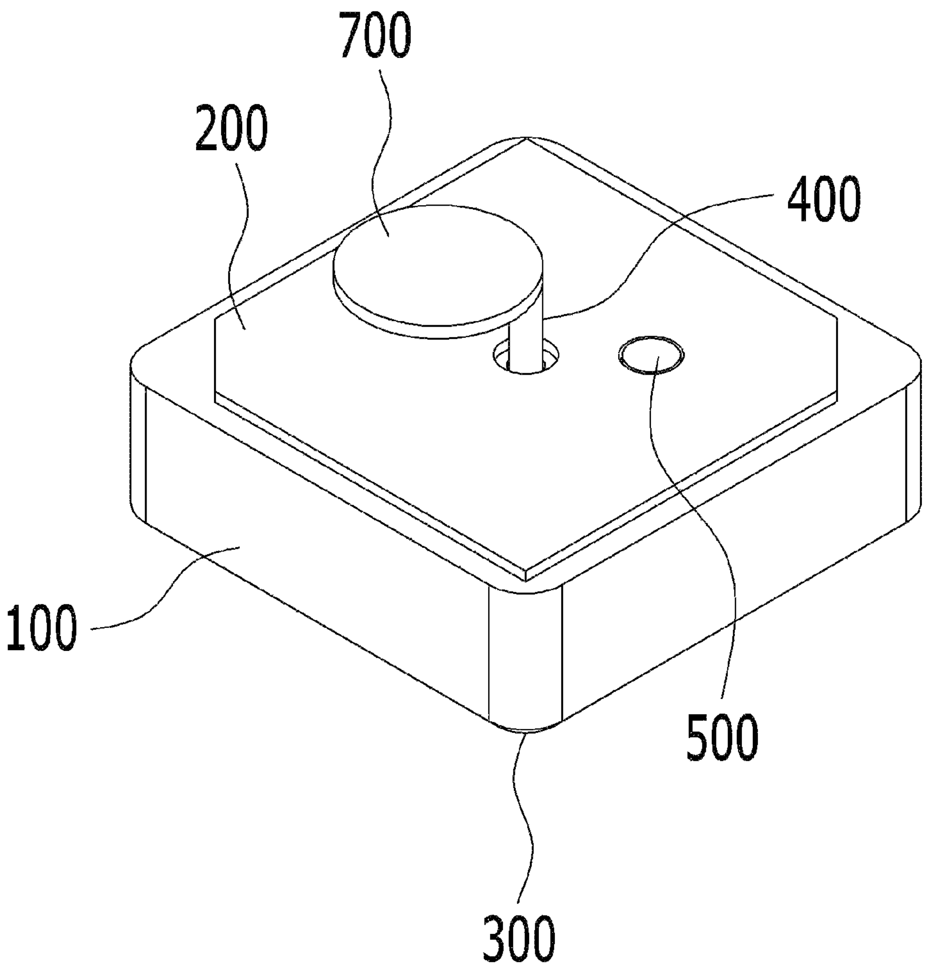

[FIG. 21]
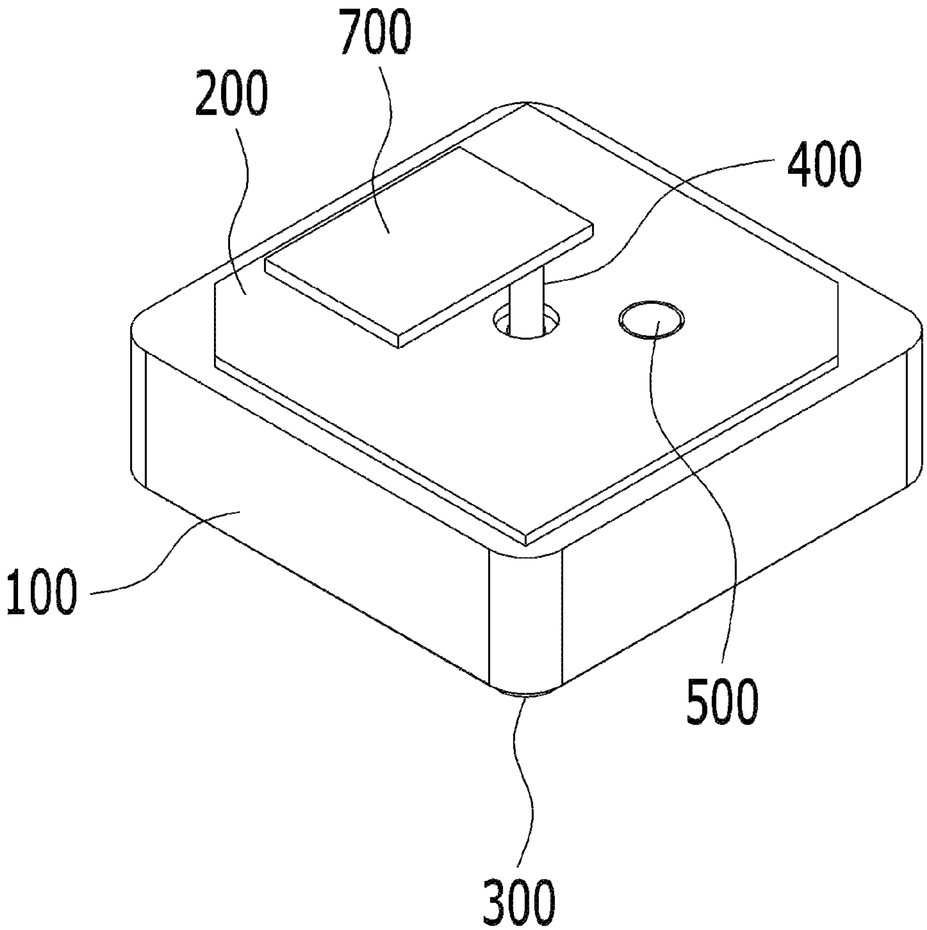

[FIG. 22]
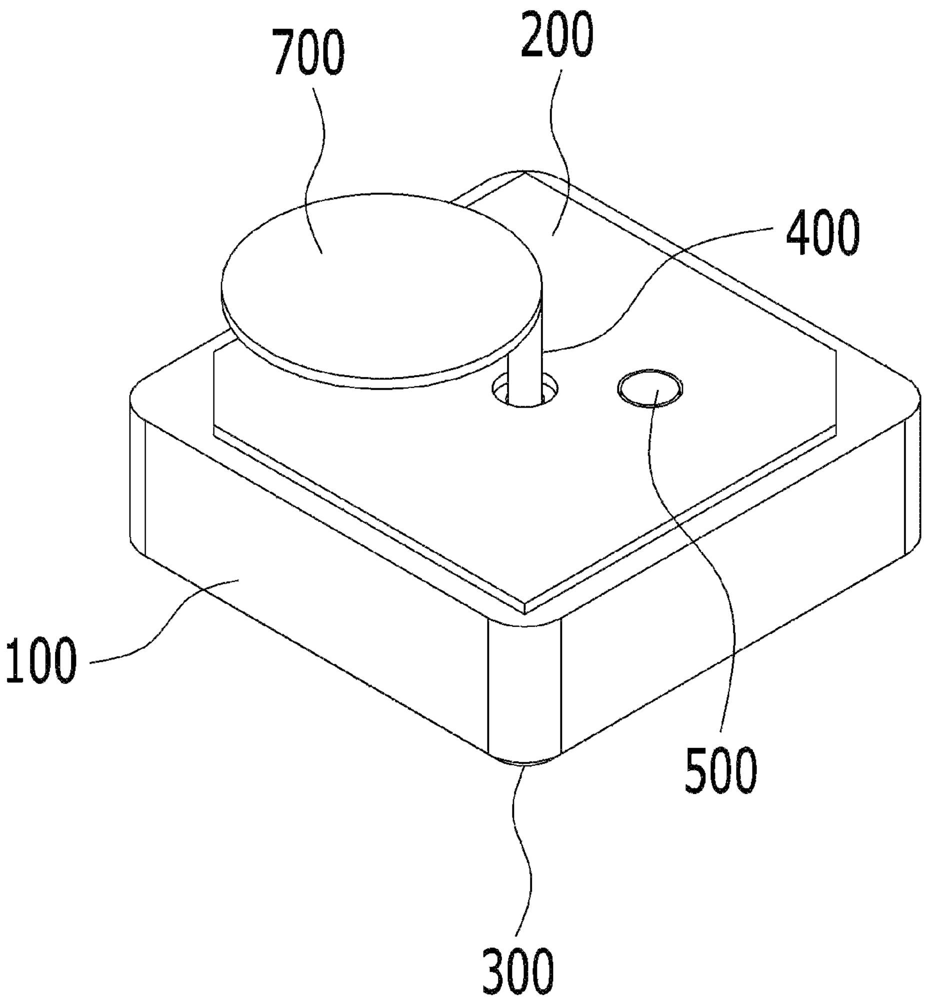

[FIG. 23]
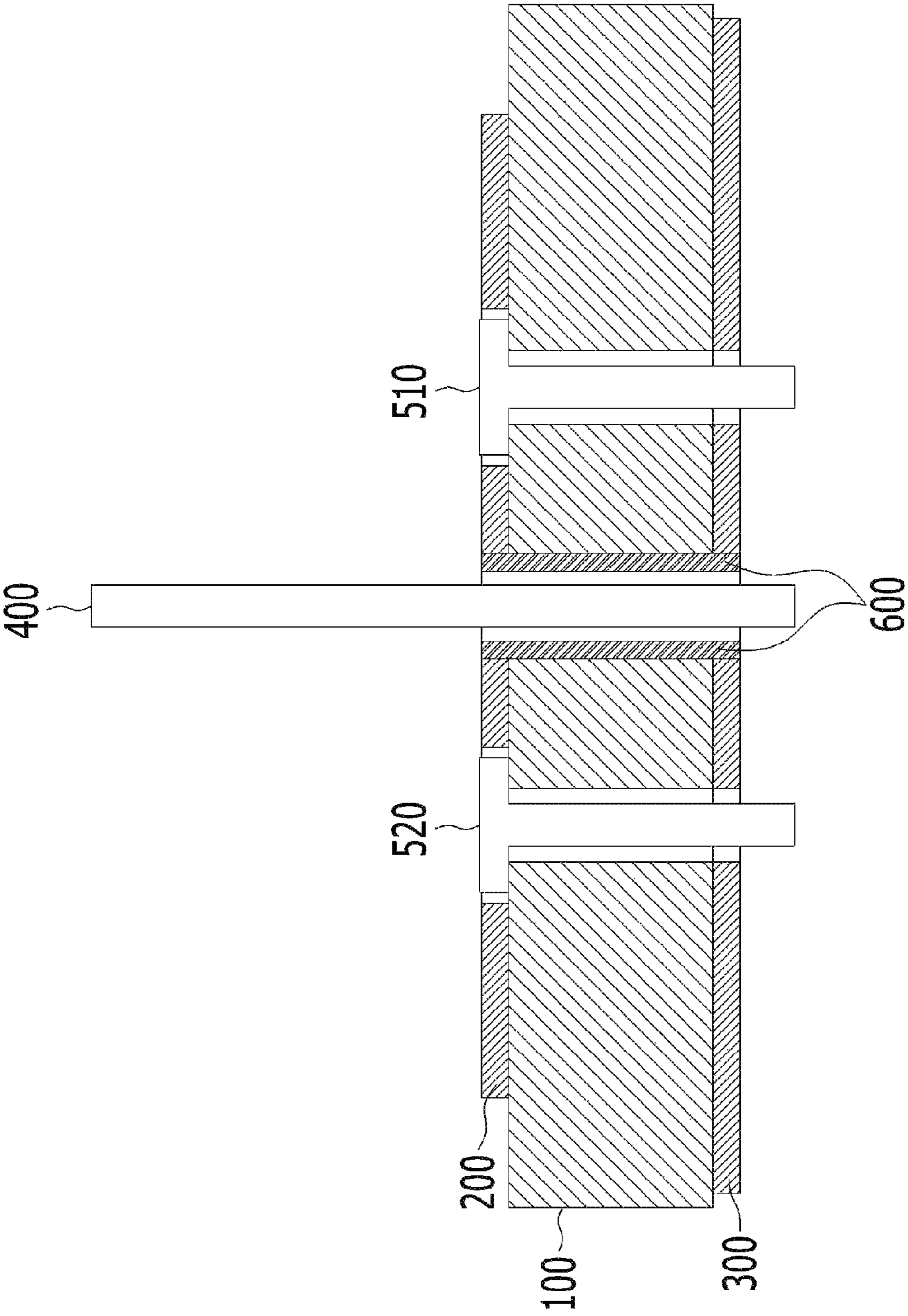

[FIG. 24]
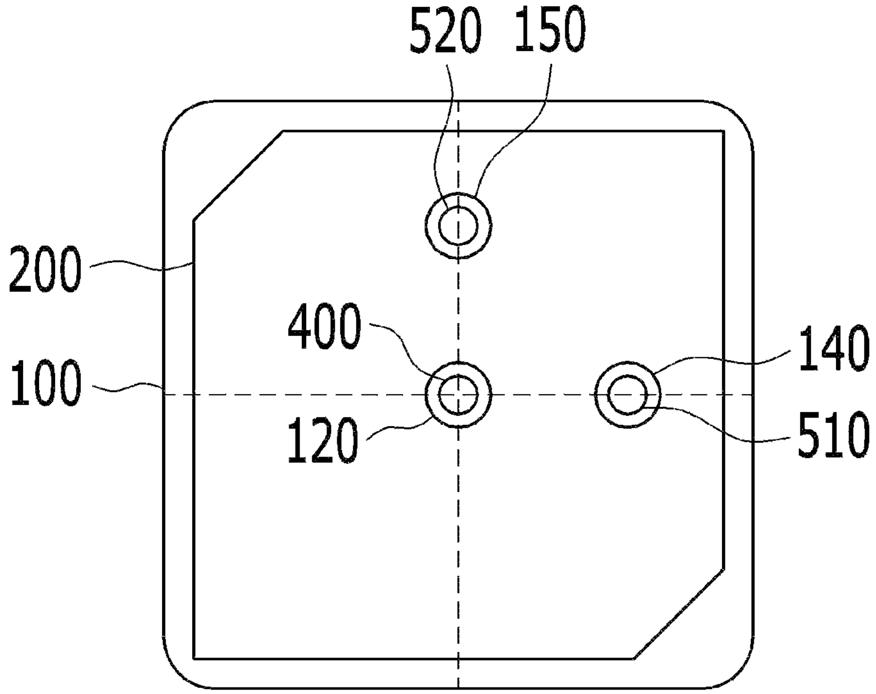

[FIG. 25]
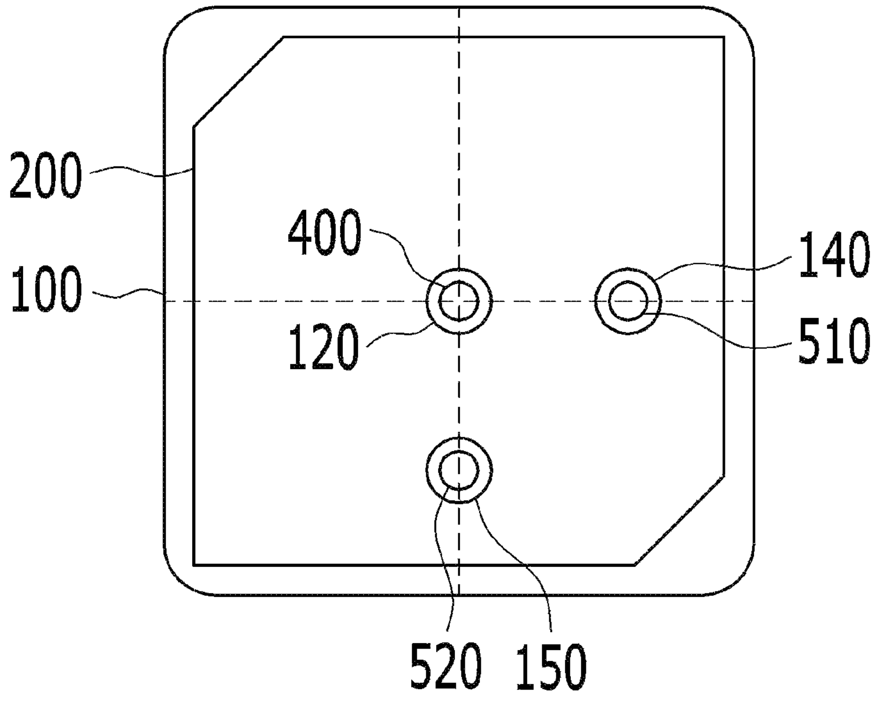

[FIG. 26]
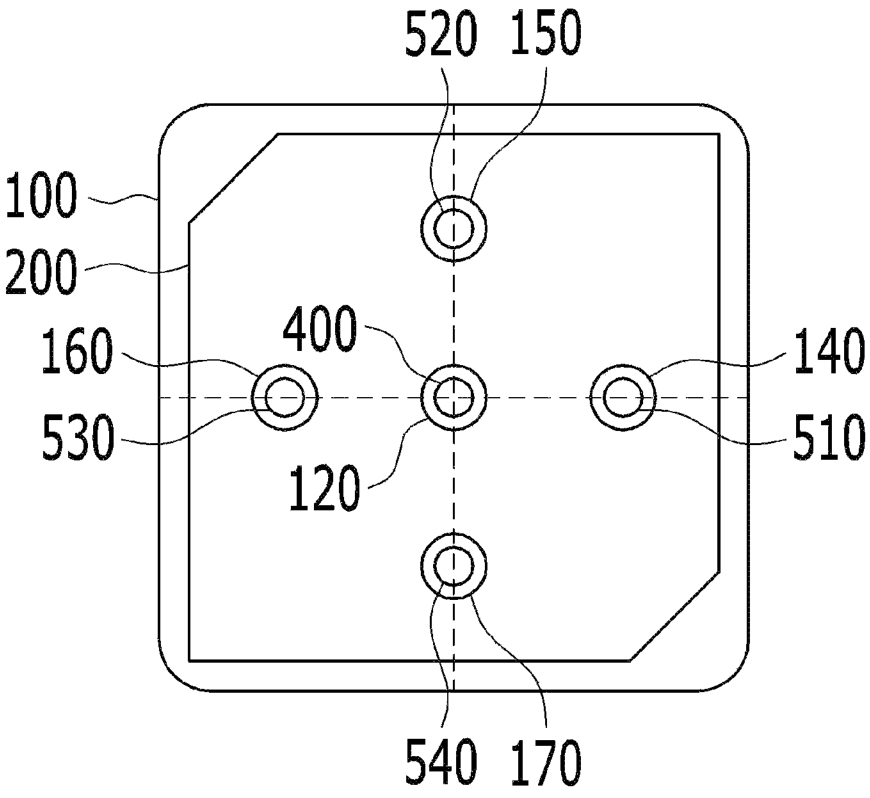

[FIG. 27]
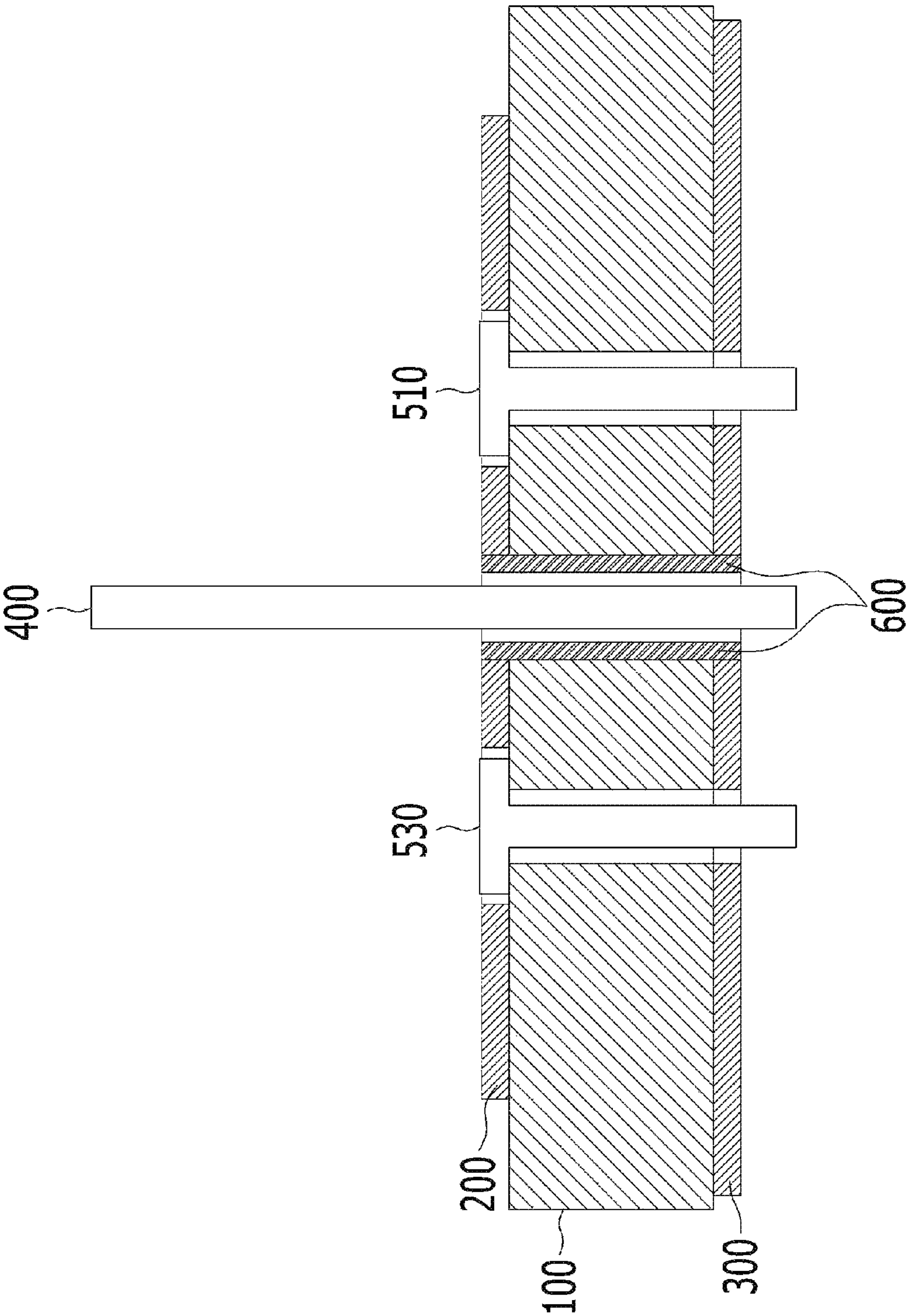

[FIG. 28]
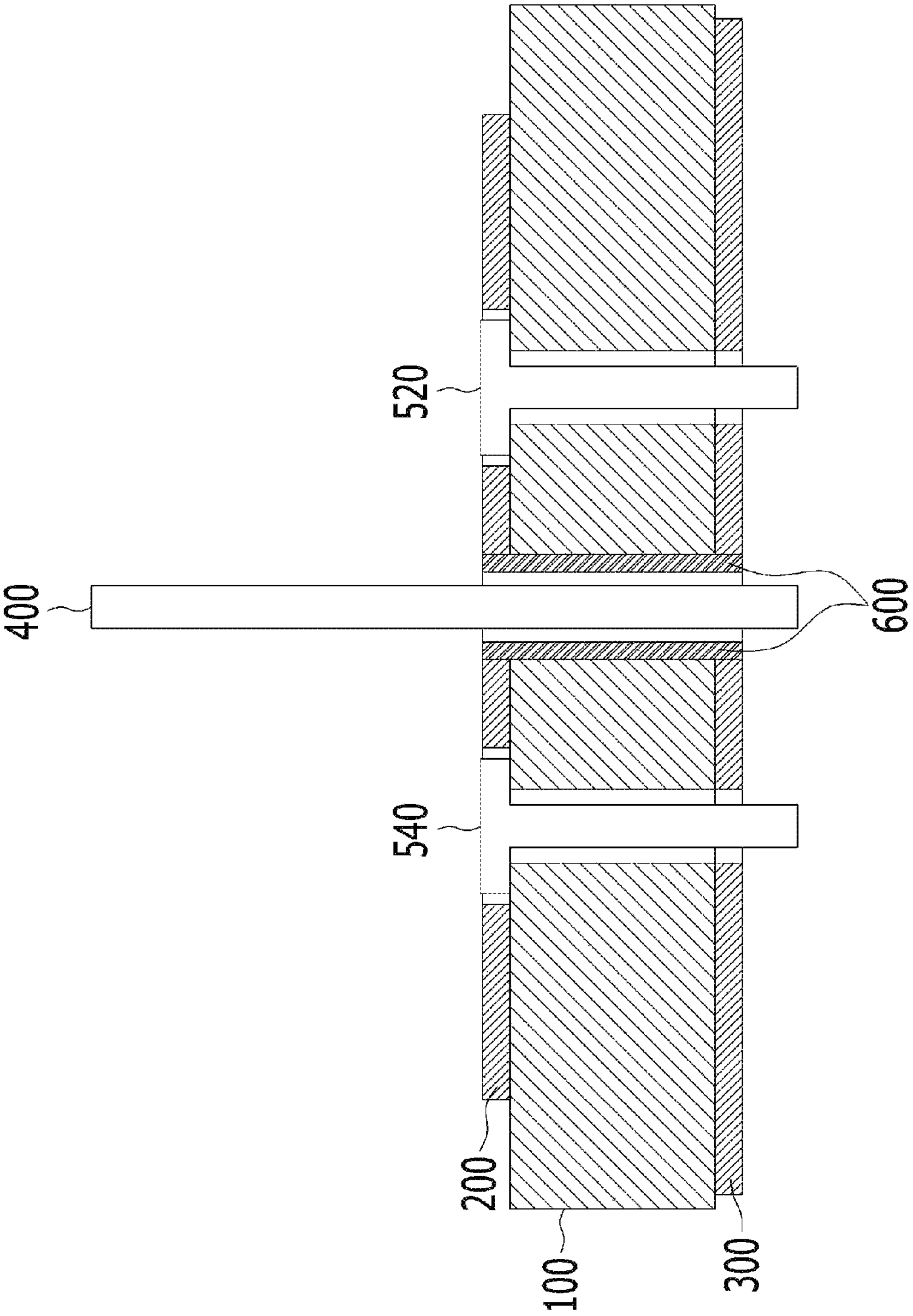

[FIG. 29]
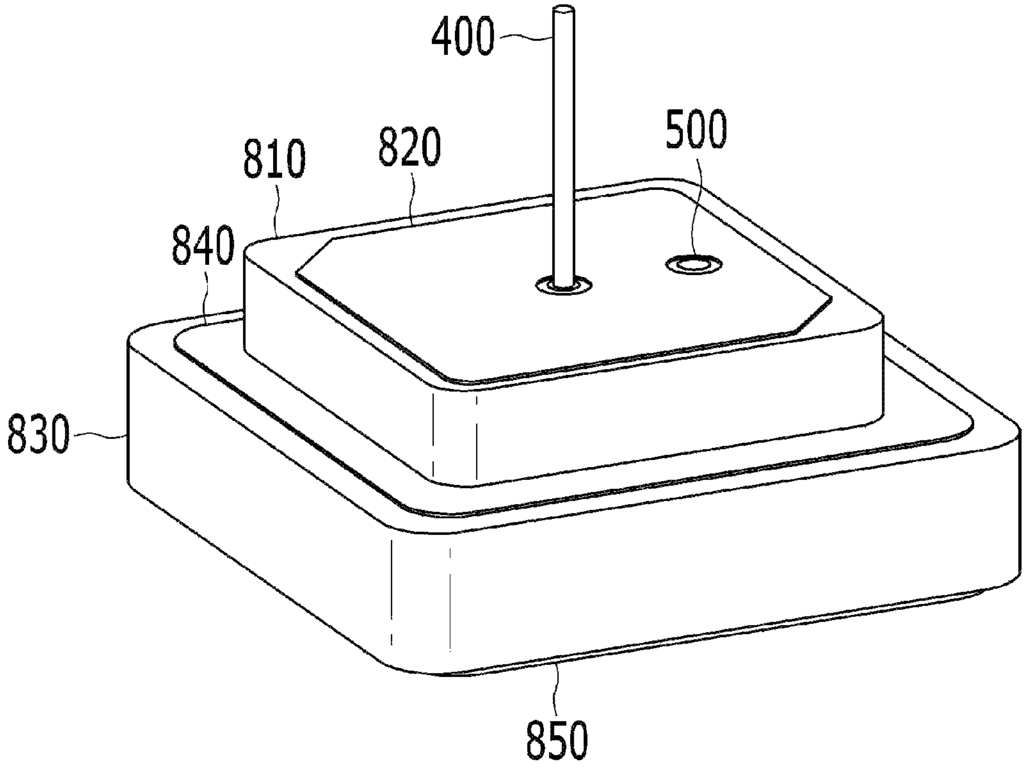

[FIG. 30]
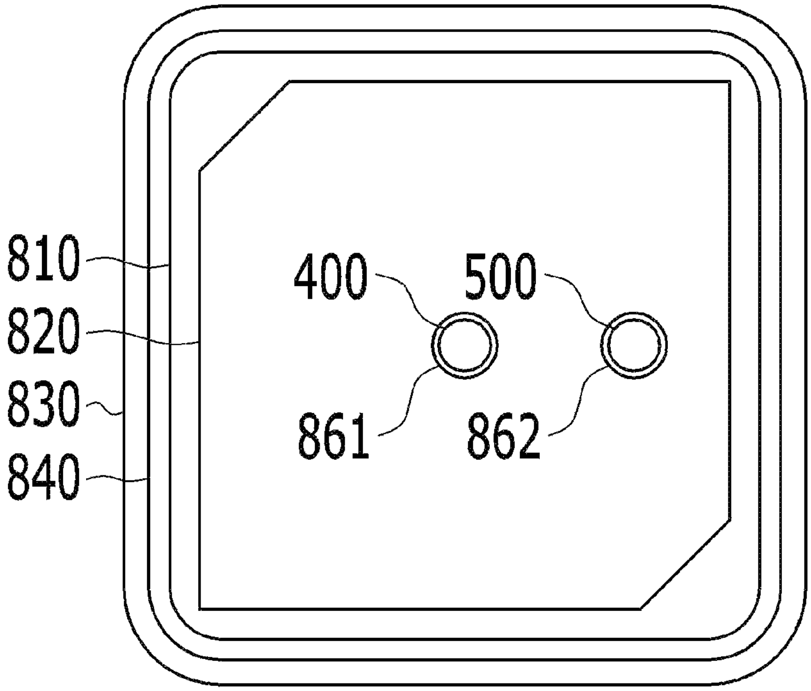

[FIG. 31]
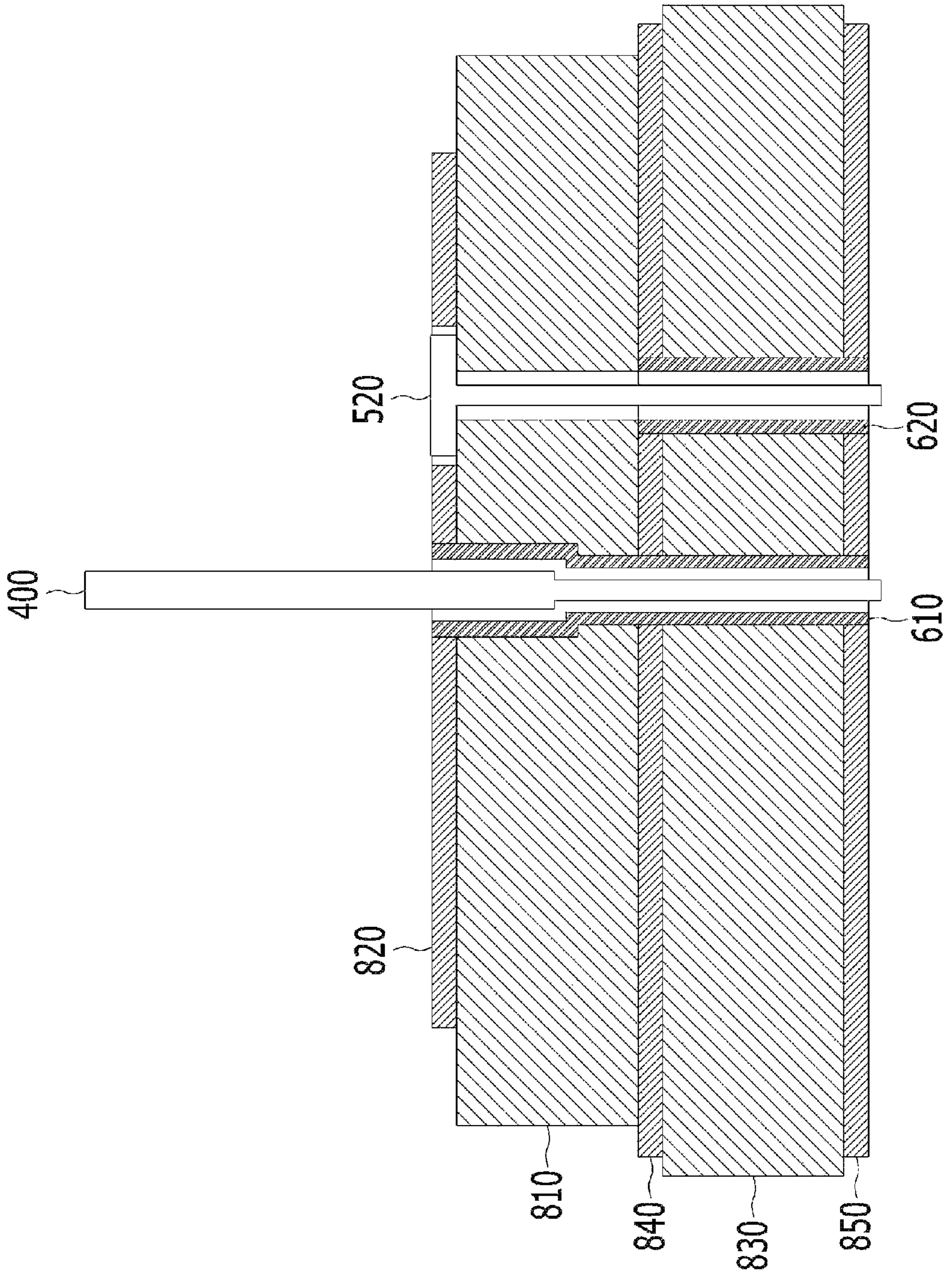

[FIG. 32]
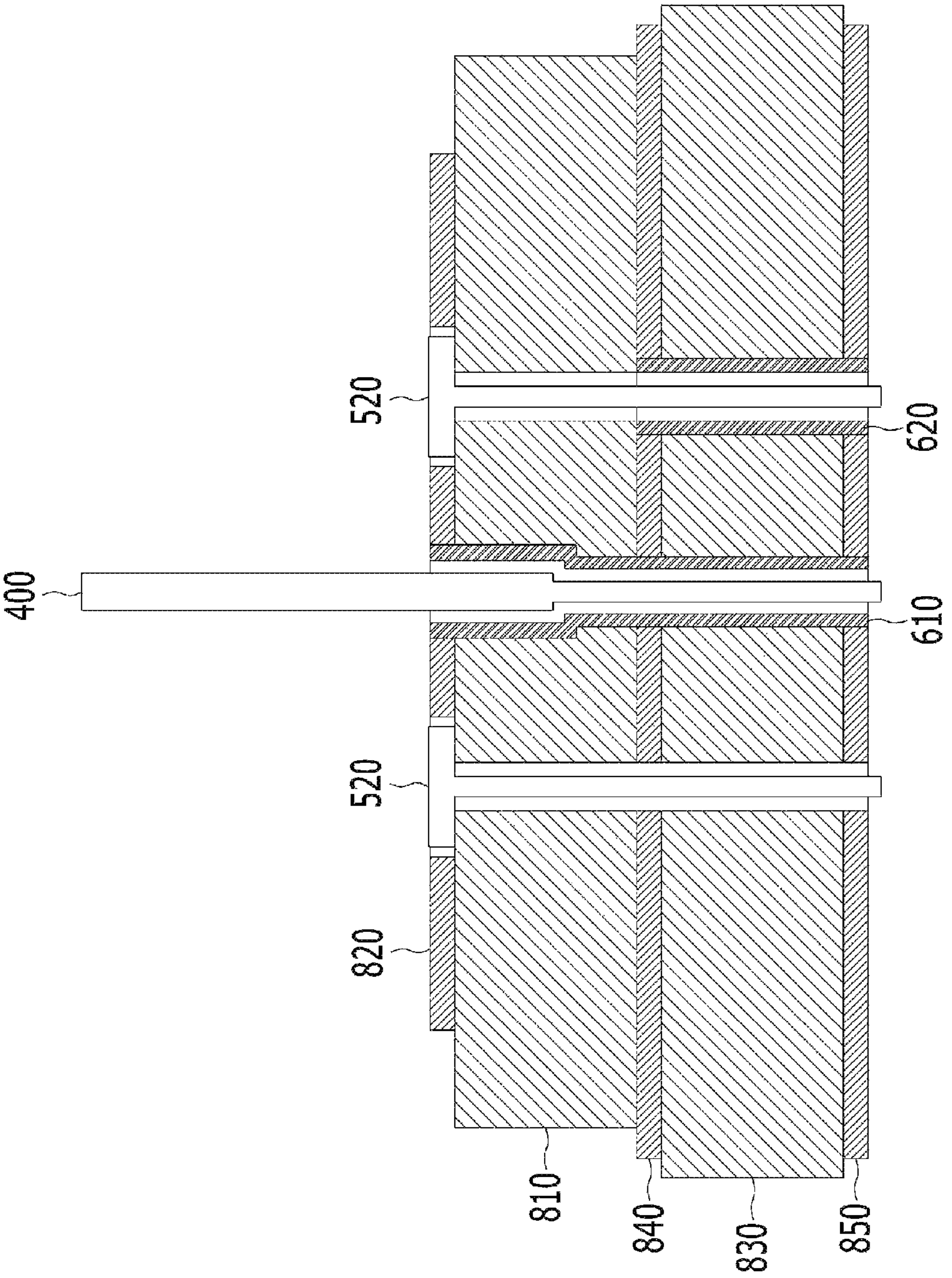

[FIG. 33]
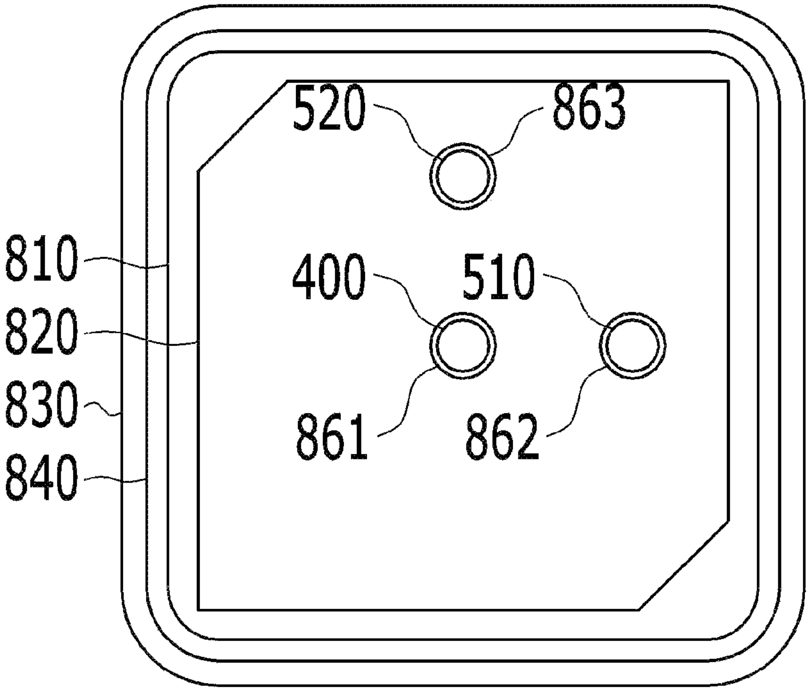

[FIG. 34]
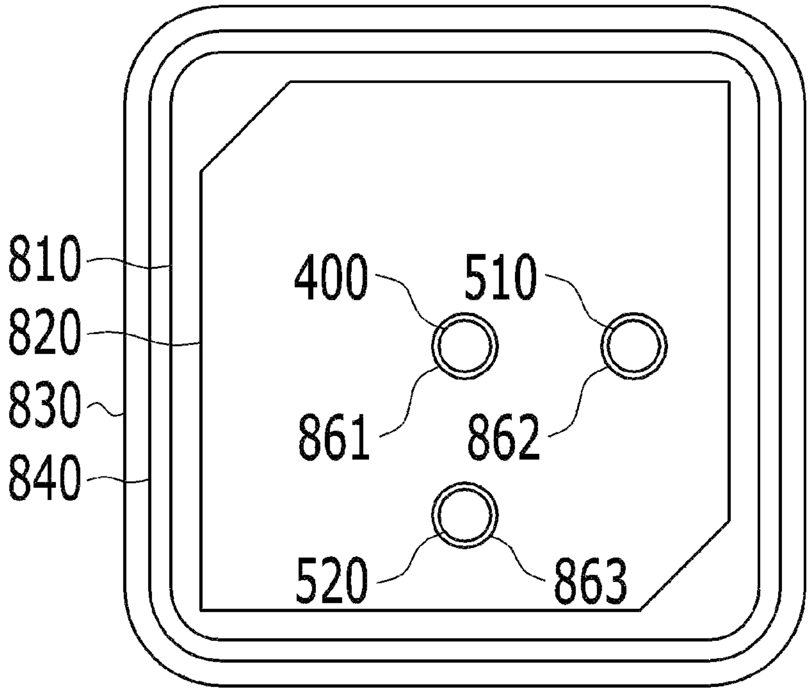

[FIG. 35]
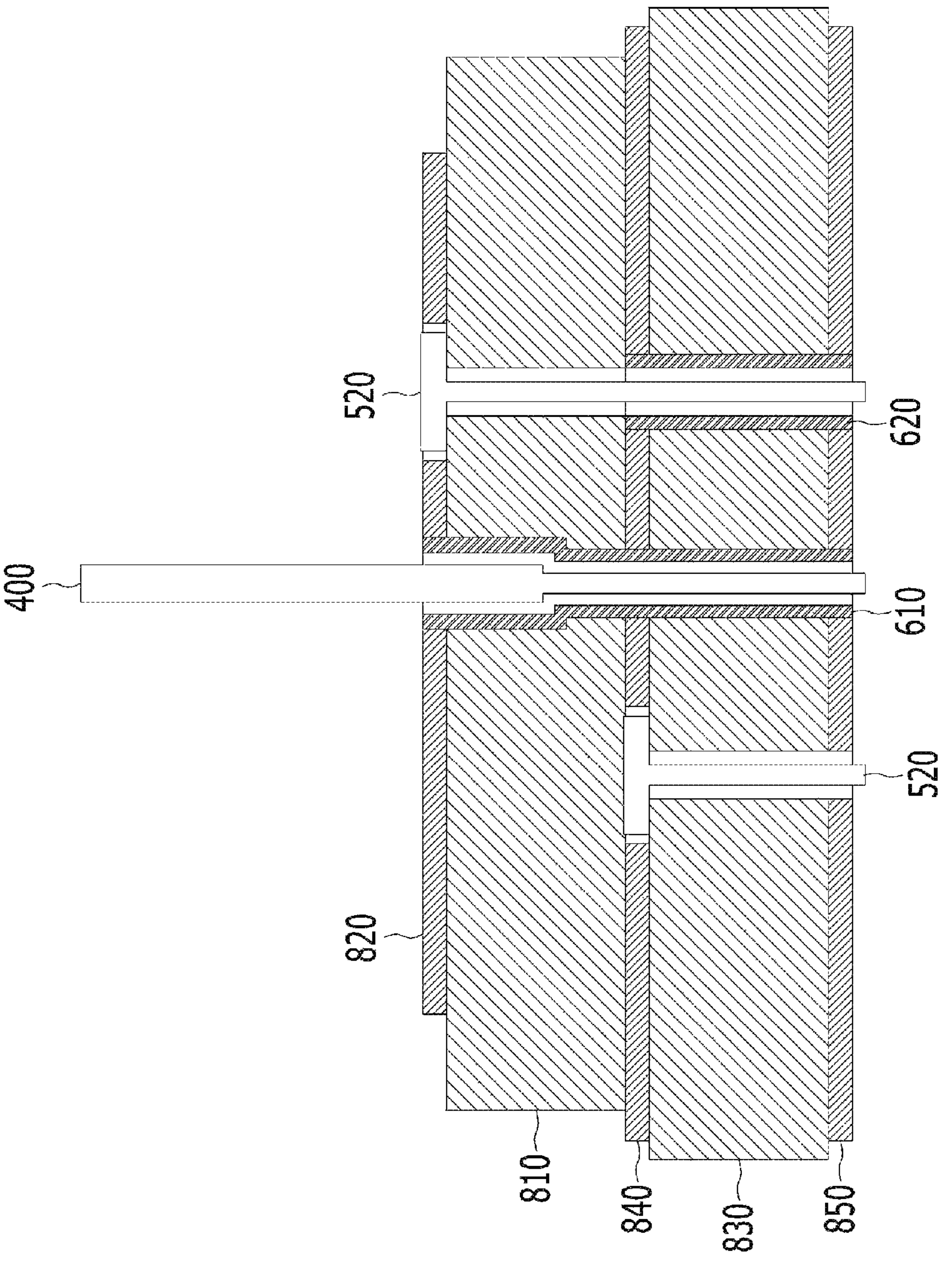

[FIG. 36]
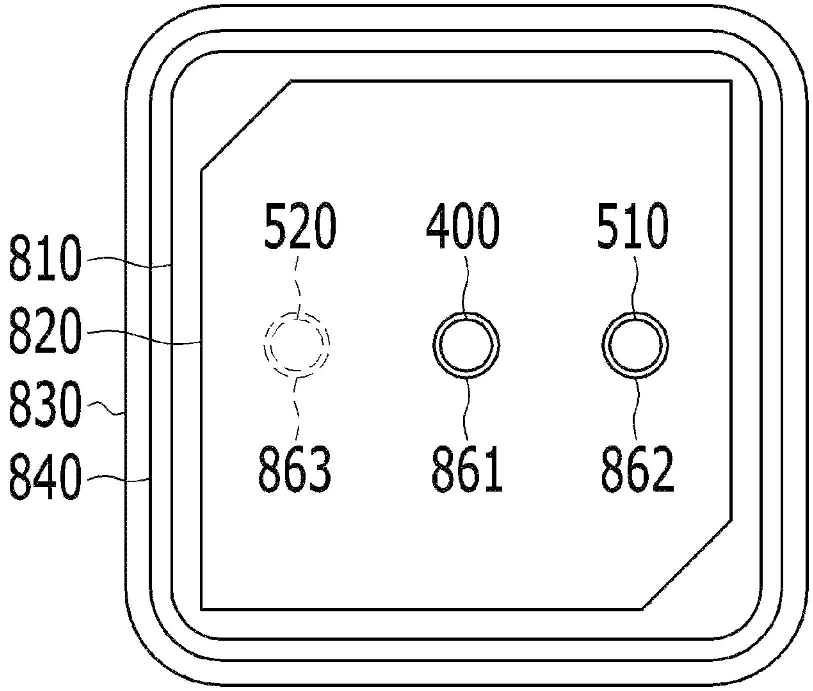

[FIG. 37]
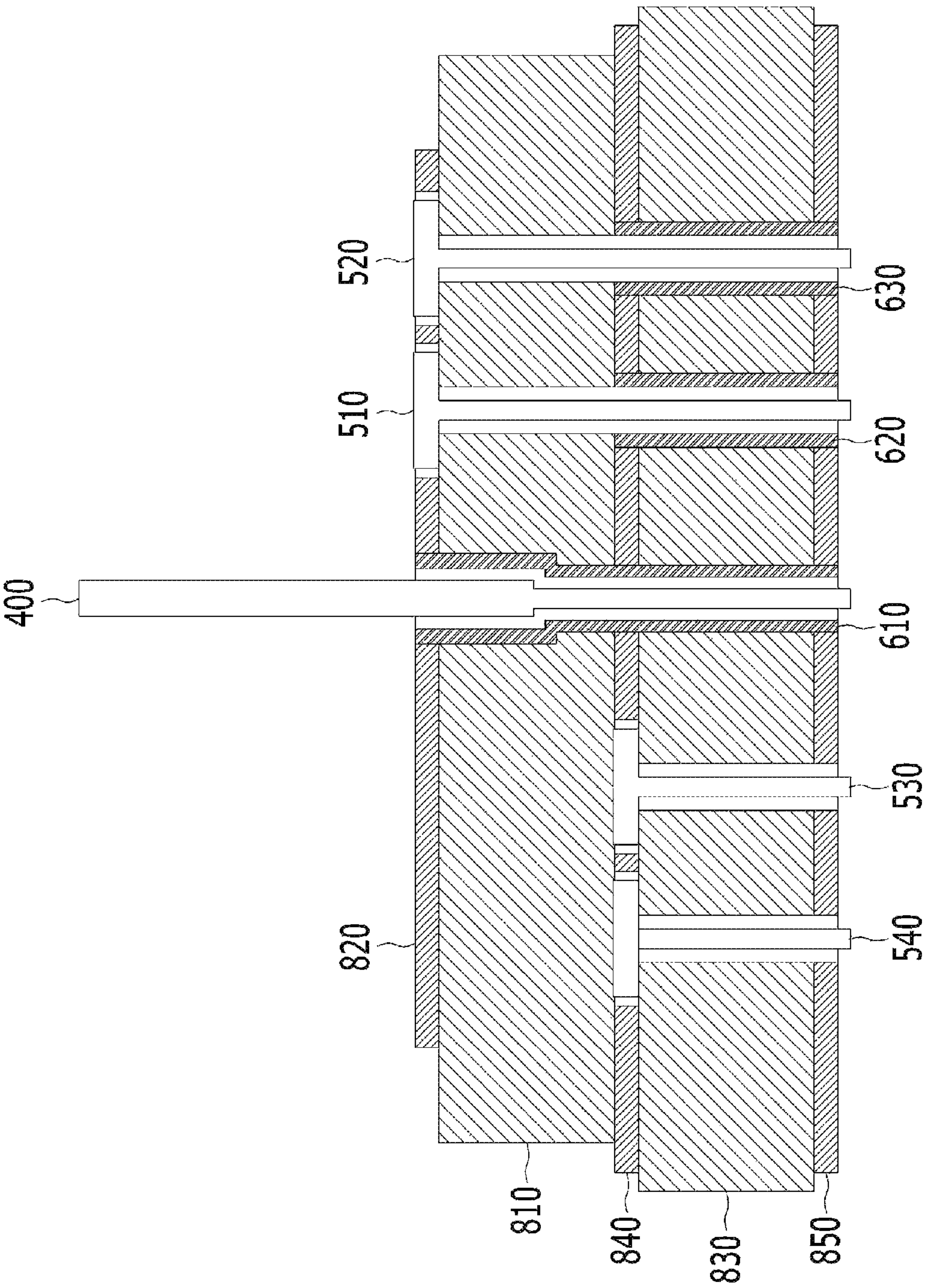

[FIG. 38]
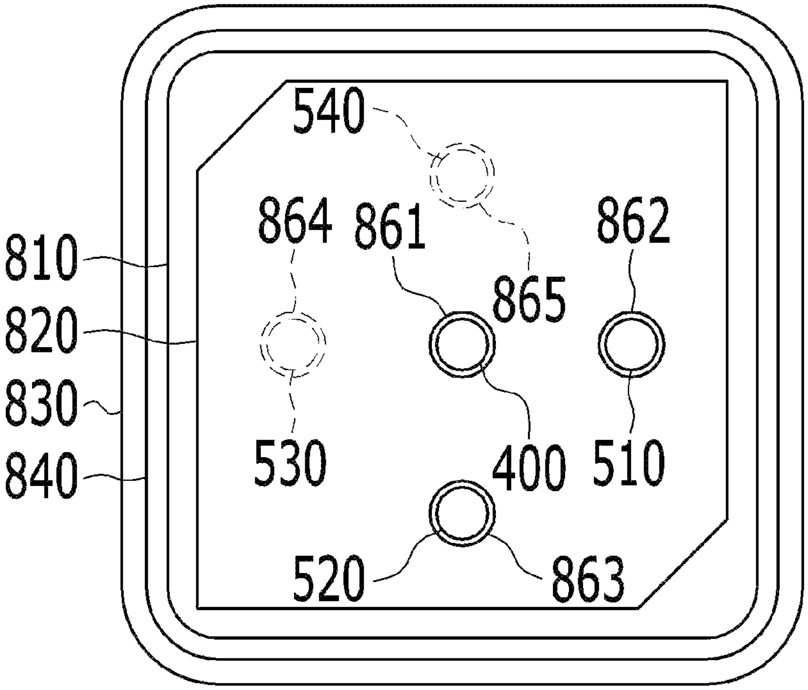

MULTI-BAND PATCH ANTENNA

TECHNICAL FIELD

The present disclosure relates to a multi-band patch antenna, and more particularly, to a multi-band patch antenna which resonates in the V2X (Vehicle to Everything) frequency band and the frequency band of at least one of the GPS (Global Positioning System), GLONASS (GLObal NAvigation Satellite System), and SDARS (Satellite Digital Audio Radio Service).

BACKGROUND ART

A shark antenna indicates an antenna which is installed to improve the signal reception rates of electronic devices installed in a vehicle. In general, the shark antenna has a GNSS antenna, an SDARS (Sirius, XM) antenna and the like, which are embedded therein. Examples of the GNSS include a GPS antenna (US) and a GLONASS antenna (Russia).

Recently, research is being conducted on a technology for embedding a V2X antenna in the shark antenna, the V2X antenna being added due to the influence of autonomous driving or the like.

However, the V2X antenna needs to resonate in a frequency of about 5.9 Ghz, and thus requires a length of about 10 mm. However, the existing shark antenna has an insufficient mounting space, which makes it difficult to provide a space required for the V2X antenna.

Furthermore, when the V2X antenna is added to an existing patch antenna, the number of manufacturing processes needs to be increased, and the design of the existing patch antenna needs to be changed.

SUMMARY OF INVENTION

Technical Problem

The present disclosure is proposed to solve the above conventional problem, and an object of the present disclosure is to provide a multi-band patch antenna in which an antenna pin is inserted into a single-band patch antenna, so that the multi-band patch antenna requires a minimum mounting space and can resonate in both the existing frequency bands and the V2X frequency band.

Solution to Problem

To achieve the object, a multi-band patch antenna according to an exemplary embodiment of the present disclosure includes: a base substrate through which a first through-hole and a second through-hole are formed; an upper patch disposed on a top surface of the base substrate; a lower patch disposed on a bottom surface of the base substrate; an inner conductor disposed on an inner wall surface of the first through-hole to electrically connect the upper patch to the lower patch; an antenna pin extending through the first through-hole, and having an end disposed above the base substrate; and a feed pin extending through the second through-hole.

The antenna pin may extend through the center axis of the base substrate. At this time, the center axis may be a virtual axis disposed on a line that connects the center point of the top surface of the base substrate to the center point of the bottom surface of the base substrate.

The first through-hole may extend through the center axis of the base substrate, and the second through-hole may extend through the base substrate at a position spaced apart from the center axis of the base substrate.

The inner conductor may be formed along the inner wall surface of the first through-hole, and form a hole through which the antenna pin extends, and the antenna pin may be spaced apart from the inner conductor. At this time, the antenna pin may have an insulating layer formed on a region thereof, the region being disposed in the first through-hole.

The antenna pin may be an antenna that resonates in the V2X frequency band, and a portion of the antenna pin, exposed from the top of the base substrate, may have a length of 10 mm or more.

The antenna pin may have one or more bent portions formed on a region thereof, the region being exposed from the top of the base substrate, and an end of the antenna pin, exposed from the top of the base substrate, may be disposed at a position spaced apart from the center axis of the base substrate.

The multi-band patch antenna may further include a metal plate disposed above the base substrate, and the metal plate may be coupled to the end of the antenna pin, exposed from the top of the base substrate. At this time, the end of the antenna pin may be coupled to a position spaced apart from the center axis of the metal plate. The metal plate may be formed in a plate shape with a top surface, a bottom surface, and a side surface, and the end of the antenna pin is coupled to the side surface of the metal plate.

Advantageous Effects

According to the present disclosure, the multi-band patch antenna may have the antenna pin configured by passing a metal pin through the center axis of the base substrate, which makes it possible to provide an antenna which resonates in the V2X frequency band as well as the existing frequency bands such as the GPS, GLONASS, and SDARS bands.

Furthermore, the multi-band patch antenna may be implemented as a patch antenna which resonates in multiple bands and is configured by inserting the antenna pin into the central portion of the base substrate without changing the design of an existing patch antenna which includes a base substrate as a dummy space into which a feed pin cannot be inserted.

Furthermore, since the multi-band patch antenna has a bent portion formed in the region exposed from the top of the base substrate, the height of the multi-band patch antenna may be minimized when the multi-band patch antenna is installed, which makes it possible to implement a patch antenna which resonates in multiple bands, while minimizing the mounting space.

Furthermore, as the inner conductor is disposed in the through-hole into which the antenna pin is inserted, the multi-band patch antenna can minimize the reduction in isolation which may occur in a patch antenna composed of an upper patch and a feed pin.

Furthermore, as the inner conductor is disposed in the through-hole into which the antenna pin is inserted, the average gain and the maximum gain may be improved, which makes it possible to improve the performance of the antenna.

BRIEF DESCRIPTION OF DRAWINGS

FIGS. 1 to 3 are diagrams for describing a multi-band patch antenna in accordance with an embodiment of the present disclosure.

FIGS. 4 and 5 are diagrams for describing a base substrate of FIG. 1.

FIG. 6 is a diagram for describing an upper patch of FIG. 1.

FIG. 7 is a diagram for describing a lower patch of FIG. 1.

FIGS. 8 and 9 are diagrams for describing an antenna pin of FIG. 1.

FIG. 10 is a diagram for describing a modified example of the multi-band patch antenna in accordance with the embodiment of the present disclosure.

FIGS. 11 to 13 are diagrams for describing another modified example of the multi-band patch antenna in accordance with the embodiment of the present disclosure.

FIGS. 14 to 16 are diagrams for describing the characteristics of the multi-band patch antenna when an inner conductor of FIGS. 10 and 13 is formed.

FIGS. 17 to 19 are diagrams for describing still another modified example of the multi-band patch antenna in accordance with the embodiment of the present disclosure.

FIGS. 20 to 22 are diagrams for describing yet another modified example of the multi-band patch antenna in accordance with the embodiment of the present disclosure.

FIGS. 23 to 28 are diagrams for describing still yet another modified example of the multi-band patch antenna in accordance with the embodiment of the present disclosure.

FIGS. 29 to 38 are diagrams for describing a multi-band patch antenna in accordance with another embodiment of the present disclosure.

DESCRIPTION OF EMBODIMENTS

Hereinafter, the most preferred exemplary embodiments of the present disclosure will be described with reference to the accompanying drawings in order to specifically describe the exemplary embodiments such that those skilled in the art to which the present disclosure pertains may easily implement the technical spirit of the present disclosure. First, in adding reference numerals to the components of each drawing, it should be noted that the same components have the same reference numerals as much as possible even if they are illustrated in different drawings. Further, in describing the present disclosure, when it is determined that the detailed description of the related well-known configuration or function may obscure the gist of the present disclosure, the detailed description thereof will be omitted.

Referring to FIGS. 1 to 3, a multi-band patch antenna in accordance with an embodiment of the present disclosure includes a base substrate 100, an upper patch 200, a lower patch 300, an antenna pin 400, and a feed pin 500.

The base substrate 100 is made of a dielectric material. That is, the base substrate 100 is configured as a dielectric substrate made of a ceramic material having characteristics such as a high dielectric constant and low thermal expansion coefficient.

The base substrate 100 may be made of a magnetic material. That is, the base substrate 100 may be configured as a magnetic material substrate made of a magnetic material such as ferrite.

The base substrate 100 has a plurality of through-holes through which the antenna pin 400 and the feed pin 500 respectively pass. For example, the base substrate 100 has a first through-hole 120 through which the antenna pin 400 extends and a second through-hole 140 through which the feed pin 500 extends.

Referring to FIGS. 4 and 5, the first through-hole 120 is formed through the base substrate 100 along the center axis of the base substrate 100. That is, since the antenna pin 400 needs to extend through the center axis of the base substrate 100 in order to resonate in the V2X band, the first through-hole 120 is formed in the center of the base substrate 100. The center axis is a virtual axis which extends through the center points of the top and bottom surfaces of the base substrate 100.

The second through-hole 140 is formed at a position spaced apart from the center axis of the base substrate 100 so as to extend through the base substrate 100. That is, the second through-hole 140 is spaced apart by a predetermined distance from the first through-hole 120 extending through the center of the base substrate 100.

The upper patch 200 is disposed on the top surface of the base substrate 100. The upper patch 200 is configured as a thin plate made of a conductive material such as copper, aluminum, gold or silver, which has high electrical conductivity. The upper patch 200 may be formed in various shapes such as a rectangle, triangle, and octagon, depending on the shape of the base substrate 100. The shape of the upper patch may be changed to various shapes through a frequency tuning process or the like. In this case, as power is fed to the upper patch 200 through the feed pin 500, the multi-band patch antenna operates as an antenna which resonates in one frequency band of one of the GNSS and the SDARS (Sirius, XM). Examples of the GNSS include the GPS (US) and the GLONASS (Russia).

Referring to FIG. 6, the upper patch 200 has through-holes 220 corresponding to the first and second through-holes 120 and 140 of the base substrate 100, respectively. At this time, the through-holes 220 formed in the upper patch 200 may have a larger diameter than the first and second through-holes 120 and 140.

The lower patch 300 is disposed on the bottom surface of the base substrate 100. The lower patch 300 is configured as a thin plate made of a conductive material such as copper, aluminum, gold or silver, which has high electrical conductivity. The lower patch 300 may be formed in various shapes such as a rectangle, triangle, and octagon, depending on the shape of the base substrate 100. The shape of the lower patch may be changed to various shapes through a frequency tuning process or the like. The lower patch 300 may be a patch for ground GND, for example.

Referring to FIG. 7, the lower patch 300 has through-holes 320 corresponding to the first and second through-holes 120 and 140, respectively. At this time, the through-holes 320 formed in the lower patch 300 may have a larger diameter than the first and second through-holes 120 and 140.

The antenna pin 400 extends through the base substrate 100, the upper patch 200, and the lower patch 300. That is, the antenna pin 400 is formed in a straight cylindrical shape with a predetermined diameter, and extends through the first through-hole 120. The antenna pin 400 extends through the center axis of the base substrate 100 via the first through-hole 120, the center axis corresponding to a virtual axis extending through the center points of the top and bottom surfaces of the base substrate 100.

At this time, the multi-band patch antenna in accordance with the embodiment of the present disclosure may be implemented as a patch antenna which resonates in multiple bands and is configured by inserting the antenna pin 400 into the central portion of the base substrate 100 without changing the design of an existing patch antenna which includes a base substrate as a dummy space into which the feed pin 500 cannot be inserted.

Furthermore, the multi-band patch antenna in accordance with the embodiment of the present disclosure does not need to secure a space for implementing an additional antenna, which makes it possible to implement a patch antenna which resonates in multiple bands while preventing the increase in a mounting space.

The antenna pin 400 operates as a monopole-type antenna which is exposed from the top of the base substrate 100, and resonates in a different frequency band from the upper patch 200. For example, the antenna pin 400 is exposed by a preset length Dth or more from the top surface of the base substrate 100, and operates a monopole antenna which resonates in the V2X frequency band.

The antenna pin 400 is formed in a cylindrical shape having a first end and a second end facing the first end.

The first end of the antenna pin 400 is exposed from the bottom surface of the base substrate 100 through the upper patch 200, the base substrate 100, and the lower patch 300. That is, the first end of the antenna pin 400 sequentially extends through the through-holes 220 and 320 corresponding to the first through-hole 120, among the first through-hole 120 of the base substrate 100 and the through-holes 220 and 320 of the upper and lower patches 200 and 300. The first end of the antenna pin 400 is exposed by a predetermined length from the bottom of the base substrate 100.

The second end of the antenna pin 400 is disposed above the base substrate 100. The second end of the antenna pin 400 is spaced apart from the top surface of the base substrate 100. The second end of the antenna pin is exposed from the top of the base substrate 100. The second end of the antenna pin 400 is exposed by the length Dth or more from the top of the base substrate 100.

Only when the antenna pin 400 is exposed by about 10 mm or more from the top of the base substrate 100, the antenna pin 400 may operate as an antenna which resonates in the V2X frequency band. Thus, the preset length Dth may be set to 10 mm, for example. The preset length Dth indicates the length of the antenna pin 400 from the top surface of the base substrate 100 to the second end of the antenna pin 400.

For example, referring to FIGS. 8 and 9, the antenna pin 400 may be divided into a first region 410 exposed from the top of the base substrate 100, a second region 420 disposed in the first through-hole 120 of the base substrate 100, and a third region 430 exposed from the bottom of the base substrate 100. At this time, the first region 410 has a length corresponding to the preset length Dth.

The second region 420 may have a step S for preventing the antenna pin 400 from coming out of the bottom of the base substrate 100. In this case, the base substrate 100 has a step formed in the first through-hole 120 and corresponding to the step S of the antenna pin 400.

The antenna pin 400 may have an insulating layer formed on a region which is disposed in the first through-hole 120. The insulating layer may be formed by coating the outer circumference of the second region 420 of the antenna pin 400 with an insulating material, or formed by filling the second region 420 of the antenna pin 400 with an insulating material.

Referring to FIG. 10, the multi-band patch antenna may further include an inner conductor 600 disposed along the inner wall surface of the first through-hole 120, in order to prevent the reduction in isolation between the feed pin 500 and the antenna pin 400. At this time, the existing antenna (the upper patch 200 and the feed pin 500) has a larger influence on the interference between the antenna pin 400 and the existing antenna than the antenna pin 400. Thus, in the present embodiment, the inner conductor 600 is disposed on the inner wall surface of the first through-hole 120 into which the antenna pin 400 is inserted.

The inner conductor 600 is formed of a material selected from copper, aluminum, gold, and silver. The inner conductor 600 may be formed of an alloy including a material selected from copper, aluminum, gold, and silver. At this time, the inner conductor 600 may be configured as a sleeve ring or the like.

The inner conductor 600 electrically connects the upper patch 200 and the lower patch 300. That is, an upper end of the inner conductor 600 is electrically connected to the upper patch 200, and a lower end of the inner conductor 600 is electrically connected to the lower patch 300.

The antenna pin 400 is spaced apart from the inner conductor 600. That is, a predetermined space is formed between the outside of the antenna pin 400 and the inner circumference of the inner conductor 600. Thus, the antenna pin 400 is not electrically connected to the inner conductor 600.

Although not illustrated in the drawings, the multi-band patch antenna may further include another inner conductor 600 formed on the inner wall surface of the second through-hole 140, in order to prevent the reduction in isolation between the feed pin 500 and the antenna pin 400.

Referring to FIGS. 11 and 12, the antenna pin 400 may be formed in a cylindrical shape with no step.

Referring to FIG. 13, the antenna pin 400 is spaced by a predetermined distance apart from the inner conductor 600 formed on the inner wall surface of the first through-hole 120, so as not to be electrically connected to the inner conductor 600. In this case, the multi-band patch antenna may further include an insulating member (not illustrated) interposed between the antenna pin 400 and the inner conductor 600, in order to prevent the antenna pin 400 from falling down through the bottom of the base substrate 100.

Referring to FIG. 14, when the multi-band patch antenna does not include the inner conductor 600, interference is caused by a GNSS antenna, and parasitic resonance occurs at a frequency of about 2.8 GHz, 4.6 GHz, or 4.9 GHz. However, when the multi-band patch antenna includes the inner conductor 600, interference by the GNSS antenna is blocked, and no parasitic resonance occurs.

FIGS. 15 and 16 show that, when the multi-band patch antenna includes the inner conductor 600, the average gain and the maximum gain are increased by about 2.0 dBi, compared to when the multi-band patch antenna does not include the inner conductor 600. Thus, the performance of the antenna is improved.

Referring to FIGS. 17 to 19, the antenna pin 400 may have one or more bent portions R. That is, the antenna pin 400 may have one or more bent portions R formed in a region thereof, the region being exposed from the top of the base substrate 100. As the bent portion R is formed, the second end of the antenna pin 400 is disposed at a position spaced apart from the center axis of the base substrate 100. At this time, the position of the bent portion R may be set differently depending on the position and target where the multi-band patch antenna is installed.

Referring to FIGS. 20 to 22, the multi-band patch antenna may further include a metal plate 700 which operates as the antenna together with the antenna pin 400.

The metal plate 700 is disposed above the base substrate 100. The metal plate 700 is disposed above the base substrate 100 so as to be spaced by a predetermined distance apart from the top surface of the base substrate 100.

The metal plate 700 is coupled to the end of the antenna pin 400, exposed from the top of the base substrate 100. The metal plate 700 is coupled to the second end of the antenna pin 400, exposed from the top of the base substrate 100.

The second end of the antenna pin 400 is coupled to the metal plate 700 at a position spaced by a predetermined distance apart from the center axis of the metal plate 700. The second end of the antenna pin 400 is spaced by a predetermined distance apart from the center axis of the metal plate 700, and coupled to the metal plate 700 so as to be close to the outer circumference of the metal plate 700.

The second end of the antenna pin 400 may be coupled to a side surface of the metal plate 700. That is, the metal plate 700 may be formed in a plate shape with a top surface, a bottom surface, and a side surface, such as a circle, oval, or rectangle, and the second end of the antenna pin 400 is coupled to the side surface of the metal plate 700.

At this time, the metal plate 700 may have various shapes and sizes depending on the position and target where the multi-band patch antenna is installed.

The feed pin 500 feeds power to the upper patch 200, in order to operate the upper patch 200 as a first antenna. As the feed pin 500 extends through the second through-hole 140, the feed pin 500 is disposed at a position spaced by a predetermined distance apart from the center axis of the base substrate 100, and extends through the base substrate 100. A first end of the feed pin 500 extends through the second through-hole 140 of the base substrate 100 and the through-holes 220 and 320 corresponding to the second through-hole 140, among the through-holes 220 and 320 of the upper and lower patches 200 and 300. The first end of the feed pin 500 is disposed at the bottom of the base substrate 100 through the second through-hole 140. The feed pin 500 may have a plate-shaped pin head formed at a second end thereof, and thus may be prevented from falling down through the bottom of the base substrate 100. The feed pin 500 is spaced by a predetermined distance apart from the upper patch 200 so as not to be connected to the inner conductor 600 formed on the inner wall surface of the first through-hole 120.

The multi-band patch antenna in accordance with the embodiment of the present disclosure may include a plurality of feed pins 500 to improve an axial ratio indicating the polarization characteristic index of the antenna.

Referring to FIG. 23, the multi-band patch antenna in accordance with the embodiment of the present disclosure may include a first feed pin 510 and a second feed pin 520.

The first and second feed pins 510 feed power to the upper patch 200, in order to operate the upper patch 200 as the first antenna. The first and second feed pins 510 and 520 extend through the multi-band patch antenna in which the base substrate 100, the upper patch 200, and the lower patch 300 are stacked. A first end of the first feed pin 510 and a first end of the second feed pin 520 are disposed at the bottom of the base substrate 100 through the base substrate 100, the upper patch 200, and the lower patch 300. Furthermore, plate-shaped pin heads may be formed at a second end of the first feed pin 510 and a second end of the second feed pin 520, respectively, in order to prevent the first and second feed pins 510 and 520 from falling down through the bottom of the base substrate 100.

The first and second feed pins 510 and 520 are disposed so as to form an angle of about 90 degrees therebetween. That is, the first and second feed pins 510 and 520 are disposed so that a first straight line extending through the center of the antenna pin 400 and the center of the first feed pin 510 and a second straight line extending through the center of the antenna pin 400 and the center of the second feed pin 520 form an angle of about 90 degrees therebetween, when seen from the top of the multi-band patch antenna.

At this time, the second feed pin 520 is disposed at a position (see FIG. 24) where the first feed pin 510 rotates by about 90 degrees in the counterclockwise direction CCW around the antenna pin 400, or disposed at a position (see FIG. 25) where the first feed pin 510 rotates by about 90 degrees in the clockwise direction CW around the antenna pin 400.

For this structure, the multi-band patch antenna has the second through-hole 140 and a third through-hole 150 formed therein, and the second and third through-holes 140 and 150 are disposed so as to form an angle of about 90 degrees therebetween. That is, the second and third through-holes 140 and 150 are disposed so that a first straight line extending through the center of the second through-hole 140 and the center of the first through-hole 120 through which the antenna pin 400 extends and a second straight line extending through the center of the first through-hole 120 and the center of the third through-hole 150 form an angle of about 90 degrees therebetween, when seen from the top of the multi-band patch antenna. At this time, the third through-hole 150 is disposed at a position (see FIG. 24) where the second through-hole 140 rotates by about 90 degrees in the counterclockwise direction CCW around the first through-hole 120, or disposed at a position (see FIG. 25) where the second through-hole 140 rotates by about 90 degrees in the clockwise direction CW around the first through-hole 120.

An inner conductor 600 may be formed on the inner wall surface of the first through-hole 120. That is, the inner conductor 600 is formed on the inner wall surface of the first through-hole 120, in order to prevent the interference between the antenna pin 400 and the first feed pin 510 and the interference between the antenna pin 400 and the second feed pin 520.

Referring to FIGS. 26 to 28, the multi-band patch antenna in accordance with the embodiment of the present disclosure may include the first feed pin 510, the second feed pin 520, a third feed pin 530, and a fourth feed pin 540.

The first to fourth feed pins 510, 520, 530, and 540 feed power to the upper patch 200, in order to operate the upper patch 200 as the first antenna. The first to fourth feed pins 510, 520, 530, and 540 extend through the multi-band patch antenna in which the base substrate 100, the upper patch 200, and the lower patch 300 are stacked. First ends of the first to fourth feed pins 510, 520, 530, and 540 are disposed at the bottom of the base substrate 100 through the base substrate 100, the upper patch 200, and the lower patch 300. Here, plate-shaped pin heads may be formed at second ends of the first to fourth feed pins 510, 520, 530, and 540, respectively, in order to prevent the first to fourth feed pins 510, 520, 530, and 540 from coming out of the bottom of the base substrate 100.

The first to fourth feed pins 510, 520, 530, and 540 are each disposed so as to form an angle of about 90 degrees with another feed pin adjacent thereto. That is, when seen from the top of the multi-band patch antenna, the first and third feed pins 510 and 530 are disposed on a first straight line extending through the center of the antenna pin 400 and the center of the first feed pin 510 or the third feed pin 530, and the second and fourth feed pins 520 and 540 are disposed on a second straight line extending through the center of the antenna pin 400 and the center of the second feed pin 520 or the fourth feed pin 540. At this time, the first to fourth feed pins 510, 520, 530, and 540 are disposed so that the first straight line and the second straight line form an angle of about 90 degrees therebetween. Thus, the first and second feed pins 510 and 520 form an angle of about 90 degrees therebetween, the second and third feed pins 520 and 530 form an angle of about 90 degrees therebetween, the third and fourth feed pins 530 and 540 form an angle of about 90 degrees therebetween, and the fourth and first feed pins 540 and 510 form an angle of about 90 degrees therebetween.

For example, the second feed pin 520 is disposed at a position where the first feed pin 510 rotates by about 90 degrees in the counterclockwise direction CCW around the antenna pin 400, the third feed pin 530 is disposed at a position where the first feed pin 510 rotates by about 180 degrees in the counterclockwise direction CCW around the antenna pin 400, and the fourth feed pin 540 is disposed at a position where the first feed pin 510 rotates by about 270 degrees in the counterclockwise direction CCW around the antenna pin 400.

For this structure, the multi-band patch antenna has the second through-hole 140, the third through-hole 150, a fourth through-hole 160, and a fifth through-hole 170, which are formed therein, and two adjacent through-holes are disposed so as to form an angle of about 90 degrees therebetween. That is, when seen from the top of the multi-band patch antenna, the second and fourth through-holes 140 and 160 are disposed on a first straight line extending through the center of the second through-hole 140 or the fourth through-hole 160 and the center of the first through-hole 120 through which the antenna pin 400 extends, and the third and fifth through-holes 150 and 170 are disposed on a second straight line extending through the center of the first through-hole 120 and the center of the third through-hole 150 or the fifth through-hole 170. At this time, the second to fifth through-holes 140, 150, 160, and 170 are disposed so that the first straight line and the second straight line form an angle of about 90 degrees therebetween. Thus, the second and third through-holes 140 and 150 form an angle of about 90 degrees therebetween, the third and fourth through-holes 150 and 160 form an angle of about 90 degrees therebetween, the fourth and fifth through-holes 160 and 170 form an angle of about 90 degrees therebetween, and the fifth and second through-holes 170 and 140 form an angle of about 90 degrees therebetween.

For example, the third through-hole 150 is disposed at a position where the second through-hole 140 rotates by about 90 degrees in the counterclockwise direction CCW around the first through-hole 120, the fourth through-hole 160 is disposed at a position where the second through-hole 140 rotates by about 180 degrees in the counterclockwise direction CCW around the first through-hole 120, and the fifth through-hole 170 is disposed at a position where the second through-hole 140 rotates by about 270 degrees in the counterclockwise direction CCW around the first through-hole 120.

The inner conductor 600 may be formed on the inner wall surface of the first through-hole 120. That is, the inner conductor 600 is formed on the inner wall surface of the first through-hole 120, in order to prevent the interference between the antenna pin 400 and the first feed pin 510, the interference between the antenna pin 400 and the second feed pin 520, the interference between the antenna pin 400 and the third feed pin 530, the interference between the antenna pin 400 and the fourth feed pin 540, and the interference between the antenna pin 400 and the feed pin 500.

Referring to FIGS. 29 and 30, a multi-band patch antenna in accordance with an embodiment of the present disclosure is a stack-type patch antenna, and includes an upper base substrate 810, an upper radiation patch 820 disposed on the top of the upper base substrate 810, a lower base substrate 830 disposed under the upper base substrate 810, a lower radiation patch 840 disposed on the top of the lower base substrate 830 and partially interposed between the upper base substrate 810 and the lower base substrate 830, and a lower patch 850 disposed on the bottom of the lower base substrate 830.

The multi-band patch antenna further includes an antenna pin 400 extending through the upper base substrate 810, the upper radiation patch 820, the lower base substrate 830, the lower radiation patch 840, and the lower patch 850.

The antenna pin 400 is formed in a straight cylindrical shape having a predetermined diameter, and extends through a first through-hole 861. The antenna pin 400 extends through a virtual center axis which vertically extends through the center points of the top and bottom surfaces of the upper base substrate 810 and the center points of the top and bottom surfaces of the lower base substrate 830 via the first through-hole 861. The first through-hole 861 extends through the center point of the multi-band patch antenna in which the upper base substrate 810, the upper radiation patch 820, the lower base substrate 830, the lower radiation patch 840, and the lower patch 850 are stacked.

The multi-band patch antenna further includes a feed pin 500 extending through the upper base substrate 810, the upper radiation patch 820, the lower base substrate 830, the lower radiation patch 840, and the lower patch 850.

The feed pin 500 extends through a second through-hole 862 spaced apart from the first through-hole 861. The feed pin 500 feeds power to the upper radiation patch 820, in order to operate the upper radiation patch 820 as a first antenna.

Furthermore, the feed pin 500 feeds power to the lower radiation patch 840 through electromagnetic coupling with the lower radiation patch 840. Thus, the lower radiation patch 840 operates as a second antenna which resonates in a different frequency band from the upper radiation patch 820.

Referring to FIG. 31, the multi-band patch antenna may include a first inner conductor 610 disposed along the inner wall surface of the first through-hole 861, in order to prevent the reduction in isolation between the antenna pin 400 and the feed pin 500.

The first inner conductor 610 is formed of a material selected from copper, aluminum, gold, and silver. The first inner conductor 610 may also be formed of an alloy including a material selected from copper, aluminum, gold, and silver. At this time, the first inner conductor 610 may be configured as a sleeve ring or the like.

The first inner conductor 610 electrically connects the upper radiation patch 820 and the lower patch 850. That is, an upper end of the first inner conductor 610 is electrically connected to the upper radiation patch 820, and a lower end of the first inner conductor 610 is electrically connected to the lower patch 850.

The antenna pin 400 is spaced apart from the first inner conductor 610. That is, a predetermined space is formed between the outside of the antenna pin 400 and the inner circumference of the first inner conductor 610. Thus, the antenna pin 400 is not electrically connected to the first inner conductor 610.

The multi-band patch antenna may further include a second inner conductor 620 disposed along the inner wall surface of the second through-hole 862, in order to prevent the reduction in isolation between the antenna pin 400 and the feed pin 500.

The second inner conductor 620 is formed of a material selected from copper, aluminum, gold, and silver. The second inner conductor 620 may also be formed of an alloy including a material selected from copper, aluminum, gold, and silver. At this time, the second inner conductor 620 may be configured as a sleeve ring or the like.

The second inner conductor 620 is disposed in the lower base substrate 830, and electrically connects the upper radiation patch 840 and the lower patch 850. That is, an upper end of the second inner conductor 620 is electrically connected to the lower radiation patch 840, and a lower end of the second inner conductor 620 is electrically connected to the lower patch 850. When the feed pin 500 extends through the lower base substrate 830, parasitic resonance may occur due to coupling, and the second inner conductor 620 may prevent the parasitic resonance in the lower base substrate 830 through which the feed pin 500 extends, thereby improving isolation.

The feed pin 500 is spaced apart from the second inner conductor 620. That is, a predetermined space is formed between the outside of the feed pin 500 and the inner circumference of the second inner conductor 620. Thus, the feed pin 500 is not electrically connected to the second inner conductor 620.

At this time, the existing antenna (the upper radiation patch 820 and the feed pin 500) has a larger influence on the interference between the antenna pin 400 and the existing antenna than the antenna pin 400. Thus, an inner conductor 600 may be disposed on only the inner wall surface of the first through-hole 861 into which the antenna pin 400 is inserted.

The multi-band patch antenna in accordance with the embodiment of the present disclosure may include a plurality of feed pins 500 to improve an axial ratio of the antenna.

Referring to FIG. 32, the multi-band patch antenna may include a first feed pin 510 and a second feed pin 520.

The first and second feed pins 510 and 520 feeds power to the upper radiation patch 820, in order to operate the upper radiation patch 820 as the first antenna. The first and second feed pins 510 and 520 extend through the multi-band patch antenna. A first end of the first feed pin 510 and a first end of the second feed pin 520 are disposed at the bottom of the lower base substrate 830 through the multi-band patch antenna. Here, plate-shaped pin heads may be formed at a second end of the first feed pin 510 and a second end of the second feed pin 520, respectively, in order to prevent the first and second feed pins 510 and 520 from coming out of the bottom of the lower base substrate 830.

The first and second feed pins 510 and 520 are disposed so as to form an angle of about 90 degrees therebetween. That is, the first and second feed pins 510 and 520 are disposed so that a first straight line extending through the center of the antenna pin 400 and the center of the first feed pin 510 and a second straight line extending through the center of the antenna pin 400 and the center of the second feed pin 520 form an angle of about 90 degrees therebetween, when seen from the top of the multi-band patch antenna.

For example, referring to FIG. 33, the second feed pin 520 is disposed at a position where the first feed pin 510 rotates by about 90 degrees in the counterclockwise direction CCW around the antenna pin 400. As illustrated in FIG. 34, the second feed pin 520 may be disposed at the position where the first feed pin 510 rotates by about 90 degrees in the clockwise direction CW.

For this structure, the multi-band patch antenna has the second through-hole 862 and a third through-hole 863 formed therein, and the second and third through-holes 862 and 863 are disposed so as to form an angle of about 90 degrees therebetween. That is, the second and third through-holes 862 and 863 are disposed so that a first straight line extending through the center of the second through-hole 862 and the center of the first through-hole 861 through which the antenna pin 400 extends and a second straight line extending through the center of the first through-hole 861 and the center of the third through-hole 863 form an angle of about 90 degrees therebetween, when seen from the top of the multi-band patch antenna. At this time, the third through-hole 863 may be disposed at a position (see FIG. 33) where the second through-hole 862 rotates by about 90 degrees in the counterclockwise direction CCW around the first through-hole 861, or disposed at a position (see FIG. 34) where the second through-hole 862 rotates by about 90 degrees in the clockwise direction CW around the first through-hole 861.

The inner conductor 600 may be formed on each of the inner wall surfaces of the first and second through-holes 861 and 862. That is, the first and second inner conductors 610 and 620 are formed on the inner wall surfaces of the first and second through-holes 861 and 862, respectively, in order to prevent the interference between the antenna pin 400 and the first feed pin 510 and the interference between the antenna pin 400 and the second feed pin 520. At this time, the second inner conductor 620 is not disposed in the region of the upper base substrate 810, but disposed only in the region of the lower base substrate 830, and electrically connects the lower radiation patch 840 and the lower patch 850. At this time, when the feed pin 500 extends through the lower base substrate 830, parasitic resonance may occur due to coupling, and the second inner conductor 620 may prevent the parasitic resonance in the lower base substrate 830 through which the feed pin 500 extends, thereby improving isolation.

The existing antenna (the radiation patch and the feed pin 500) has a larger influence on the interference between the antenna pin 400 and the existing antenna than the antenna pin 400. Thus, the inner conductor 600 may be disposed on only the inner wall surface of the first through-hole 861 into which the antenna pin 400 is inserted.

Referring to FIGS. 35 and 36, the first feed pin 510 may feed power to the upper radiation patch 820 to operate as the first antenna, and the second feed pin 520 may feed power to the lower radiation patch 840 to operate as the second antenna.

The first feed pin 510 feeds power to the upper radiation patch 820, in order to operate the upper radiation patch 820 as the first antenna. The first feed pin 510 extends through the first through-hole 861 of the multi-band patch antenna. The first end of the first feed pin 510 is disposed at the bottom of the lower base substrate 830 through the upper radiation patch 820, the upper base substrate 810, the lower radiation patch 840, the lower base substrate 830, and the lower patch 850. A plate-shaped pin head may be formed at the second end of the first feed pin 510, in order to prevent the first feed pin 510 from coming out of the bottom of the lower base substrate 830.

The second feed pin 520 feed power to the lower radiation patch 840, in order to operate the lower radiation patch 840 as the second antenna. The second feed pin 520 extends through the second through-hole 862 of the multi-band patch antenna. The first end of the second feed pin 520 is disposed at the bottom of the lower base substrate 830 through the lower radiation patch 840, the lower base substrate 830, and the lower patch 850, and the second end of the second feed pin 520 is interposed between the bottom surface of the upper base substrate 810 and the top surface of the lower base substrate 830. Here, a plate-shaped pin head may be formed at the second end of the second feed pin 520, in order to prevent the second feed pin 520 from coming out of the bottom of the lower base substrate 830. In this case, the pin head is interposed between the bottom surface of the upper base substrate 810 and the top surface of the lower base substrate 830.

The first and second feed pins 510 and 520 are disposed so as to form an angle of about 180 degrees therebetween. That is, when seen from the top of the multi-band patch antenna, the first feed pin 510 and the second feed pin 520 are disposed on the same line as the antenna pin 400, while facing each other with the antenna pin 400 interposed therebetween. In other words, a straight line extending through the center of the first feed pin 510 and the center of the antenna pin 400 extends through the center of the second feed pin 520, and the first feed pin 510, the antenna pin 400, and the second feed pin 520 are sequentially disposed. Thus, the first and second feed pins 510 and 520 are disposed so as to form an angle of about 180 degrees therebetween, while facing each other with the antenna pin 400 interposed therebetween.

For this structure, the multi-band patch antenna has the second and third through-holes 862 and 863 formed therein, and the second and third through-holes 862 and 863 are located at an angle of about 180 degrees therebetween. That is, when seen from the top of the multi-band patch antenna, the first through-hole 861 through which the antenna pin 400 extends, the second through-hole 862, and the third through-hole 863 are disposed on the same line, and the second and third through-holes 862 and 863 are disposed so as to face each other with the first through-hole 861 interposed therebetween. Thus, the second and third through-holes 862 and 863 form an angle of about 90 degrees therebetween. The second through-hole 862 is defined through the upper base substrate 810, the upper radiation patch 820, the lower base substrate 830, the lower radiation patch 840, and the lower patch 850, and the third through-hole 863 is defined through the lower base substrate 830, the lower radiation patch 840, and the lower patch 850.

The inner conductors 600 may be formed on the inner wall surfaces of the first to third through-holes 861 to 863, respectively. That is, the first inner conductor 610, the second inner conductor 620, and a third inner conductor 630 are formed on the inner wall surfaces of the first to third through-holes 861 to 863, respectively, in order to prevent the interference between the antenna pin 400 and the first feed pin 510 and the interference between the antenna pin 400 and the second feed pin 520.

At this time, the second and third inner conductors 620 and 630 are not disposed in a region located in the upper base substrate 810, but disposed only in the region located in the lower base substrate 830, and electrically connects the lower radiation patch 840 and the lower patch 850. At this time, when the feed pin 500 extends through the lower base substrate 830, parasitic resonance may occur due to coupling, and the second and third inner conductors 620 and 630 may prevent the parasitic resonance in the lower base substrate 830 through which the feed pin 500 extends, thereby improving isolation.

The existing antenna (the radiation patches 820 and 840 and the feed pin 500) has a larger influence on the interference between the antenna pin 400 and the existing antenna than the antenna pin 400. Thus, the inner conductor 600 may be disposed on only the inner wall surface of the first through-hole 861 into which the antenna pin 400 is inserted.

Referring to FIGS. 37 and 38, the multi-band patch antenna may include the first feed pin 510, the second feed pin 520, a third feed pin 530, and a fourth feed pin 540.

The first and second feed pins 510 and 520 feed power to the upper radiation patch 820, in order to operate the upper radiation patch 820 as the first antenna. The first and second feed pins 510 and 520 extend through the multi-band patch antenna. The first end of the first feed pin 510 and the first end of the second feed pin 520 are disposed at the bottom of the lower base substrate 830 through the multi-band patch antenna. Here, plate-shaped pin heads may be formed at the second end of the first feed pin 510 and the second end of the second feed pin 520, respectively, in order to prevent the first and second feed pins 510 and 520 from coming out of the bottom of the lower base substrate 830.

The first and second feed pins 510 and 520 are disposed so as to form an angle of about 90 degrees therebetween. That is, the first and second feed pins 510 and 520 are disposed so that a first straight line extending through the center of the antenna pin 400 and the center of the first feed pin 510 and a second straight line extending through the center of the antenna pin 400 and the center of the second feed pin 520 form an angle of about 90 degrees therebetween, when seen from the top of the multi-band patch antenna.

At this time, the second feed pin 520 may be disposed at a position where the first feed pin 510 rotates by about 90 degrees in the counterclockwise direction CCW around the antenna pin 400, or disposed at a position where the first feed pin 510 rotates by about 90 degrees in the clockwise direction CW around the antenna pin 400.

For this structure, the multi-band patch antenna has the second and third through-holes 862 and 863 formed therein, and the second and third through-holes 862 and 863 are located at an angle of about 90 degrees therebetween. That is, the second and third through-holes 862 and 863 are disposed so that a first straight line extending through the center of the second through-hole 862 and the center of the first through-hole 861 through which the antenna pin 400 extends and a second straight line extending through the center of the first through-hole 861 and the center of the third through-hole 863 form an angle of about 90 degrees therebetween, when seen from the top of the multi-band patch antenna. The third through-hole 863 may be disposed at a position where the second through-hole 862 rotates by about 90 degrees in the counterclockwise direction CCW around the first through-hole 861, or disposed at a position where the second through-hole 862 rotates by about 90 degrees in the clockwise direction CW around the first through-hole 861.

The third and fourth feed pins 530 and 540 feed power to the lower radiation patch 840, in order to operate the lower radiation patch 840 as the second antenna. The third and fourth feed pins 530 and 540 extend through parts of the multi-band patch antenna, for example, the lower base substrate 830, the lower radiation patch 840, and the lower patch 850. A first end of the third feed pin 530 and a first end of the fourth feed pin 540 are disposed at the bottom of the lower base substrate 830 through parts of the multi-band patch antenna, and a second end of the third feed pin 530 and a second end of the fourth feed pin 540 are interposed between the bottom surface of the upper base substrate 810 and the top surface of the lower base substrate 830. Here, plate-shaped pin heads may be formed at the second end of the third feed pin 530 and the second end of the fourth feed pin 540, respectively, in order to prevent the third and fourth feed pins 530 and 540 from coming out of the bottom of the lower base substrate 830. In this case, the pin heads are disposed between the bottom surface of the upper base substrate 810 and the top surface of the lower base substrate 830.

The third and fourth feed pins 530 and 540 are disposed so as to form an angle of about 90 degrees therebetween. That is, the third and fourth feed pins 530 and 540 are disposed so that a third straight line extending through the center of the antenna pin 400 and the center of the third feed pin 530 and a fourth straight line extending through the center of the antenna pin 400 and the center of the fourth feed pin 540 form an angle of about 90 degrees therebetween, when seen from the top of the multi-band patch antenna.

At this time, the fourth feed pin 540 may be disposed at a position where the third feed pin 530 rotates by about 90 degrees in the counterclockwise direction CCW around the antenna pin 400, or disposed at a position where the third feed pin 530 rotates by about 90 degrees in the clockwise direction CW around the antenna pin 400.

For this structure, the multi-band patch antenna has fourth and fifth through-holes 864 and 865 formed therein, and the fourth and fifth through-holes 864 and 865 are located at an angle of about 90 degrees therebetween. That is, the fourth and fifth through-holes 864 and 865 are disposed so that a third straight line extending through the center of the fourth through-hole 864 and the center of the first through-hole 861 through which the antenna pin 400 extends and a fourth straight line extending through the center of the first through-hole 861 and the center of the fifth through-hole 865 form an angle of about 90 degrees therebetween, when seen from the top of the multi-band patch antenna. At this time, the fifth through-hole 865 may be disposed at a position where the fourth through-hole 864 rotates by about 90 degrees in the counterclockwise direction CCW around the first through-hole 861, or disposed at a position where the fourth through-hole 864 rotates by about 90 degrees in the clockwise direction CW around the first through-hole 861.

The first feed pin 510 is disposed so as to face the third feed pin 530, with the antenna pin 400 interposed therebetween. That is, the first and third feed pins 510 and 530 are disposed so as to have an angle of about 180 degrees therebetween. When seen from the top of the multi-band patch antenna, the first feed pin 510 and the third feed pin 530 are disposed on the same line as the antenna pin 400, while facing each other with the antenna pin 400 interposed therebetween. In other words, a straight line extending through the center of the first feed pin 510 and the center of the antenna pin 400 extends through the center of the third feed pin 530, and the first feed pin 510, the antenna pin 400, and the third feed pin 530 are sequentially disposed. Thus, the first and third feed pins 510 and 530 are disposed so as to form an angle of about 180 degrees, while facing each other with the antenna pin 400 interposed therebetween.

The second feed pin 520 is disposed so as to face the fourth feed pin 540, with the antenna pin 400 interposed therebetween. That is, the second and fourth feed pins 520 and 540 are disposed so as to have an angle of about 180 degrees therebetween. When seen from the top of the multi-band patch antenna, the second feed pin 520 and the fourth feed pin 540 are disposed on the same line as the antenna pin 400, while facing each other with the antenna pin 400 interposed therebetween. In other words, a straight line extending through the center of the second feed pin 520 and the center of the antenna pin 400 extends through the center of the fourth feed pin 540, and the second feed pin 520, the antenna pin 400, and the fourth feed pin 540 are sequentially disposed. Thus, the second and fourth feed pins 520 and 540 are disposed so as to form an angle of about 180 degrees therebetween, with the antenna pin 400 interposed therebetween.

The inner conductors 600 may be formed on the inner wall surfaces of the first to third through-holes 861 to 863, respectively. That is, the first inner conductor 610, the second inner conductor 620, and the third inner conductor 630 are formed on the inner wall surfaces of the first to third through-holes 861 to 863, respectively, in order to prevent the interference between the antenna pin 400 and the first feed pin 510, the interference between the antenna pin 400 and the second feed pin 520, the interference between the antenna pin 400 and the third feed pin 530, and the interference between the antenna pin 400 and the fourth feed pin 540.

At this time, the second and third inner conductors 620 and 630 are not disposed in the region of the upper base substrate 810, but disposed only in the region of the lower base substrate 830, and electrically connect the lower radiation patch 840 and the lower patch 850. When the feed pin 500 extends through the lower base substrate 830, parasitic resonance may occur due to coupling, and the second and third inner conductors 620 and 630 may prevent the parasitic resonance in the lower base substrate 830 through which the feed pin 500 extends, thereby improving isolation.

The existing antenna (the radiation patch and the feed pin 500) has a larger influence on the interference between the antenna pin 400 and the existing antenna than the antenna pin 400. Thus, the inner conductor 600 may be disposed on only the inner wall surface of the first through-hole 861 into which the antenna pin 400 is inserted.

Although the preferred exemplary embodiments of the present disclosure have been described above, it is understood that the present disclosure may be modified in various forms, and those skilled in the art may practice various modified examples and changed examples without departing from the scope of the claims of the present disclosure.

The invention claimed is:

1. A multi-band patch antenna comprising:
 a base substrate through which a first through-hole and a second through-hole are formed;
 an upper patch disposed on a top surface of the base substrate;
 a lower patch disposed on a bottom surface of the base substrate;
 an inner conductor disposed on an inner wall surface of the first through-hole to electrically connect the upper patch to the lower patch;
 an antenna pin extending through the first through-hole, and having an end disposed above the base substrate; and
 a first feed pin extending through the second through-hole, and
 wherein the antenna pin has an insulating layer formed on a region thereof, the region being disposed in the first through-hole.

2. The multi-band patch antenna of claim 1, wherein the antenna pin extends through a center axis of the base substrate.

3. The multi-band patch antenna of claim 2, wherein the center axis is a virtual axis disposed on a line that connects a center point of the top surface of the base substrate to a center point of the bottom surface of the base substrate.

4. The multi-band patch antenna of claim 1, wherein the first through-hole extends through the center axis of the base substrate, and the second through-hole extends through the base substrate at a position spaced apart from the center axis of the base substrate.

5. The multi-band patch antenna of claim 1, wherein the inner conductor is formed along the inner wall surface of the first through-hole, and forms a hole through which the antenna pin extends, and the antenna pin is spaced apart from the inner conductor.

6. The multi-band patch antenna of claim 1, wherein a portion of the antenna pin, exposed from a top of the base substrate, has a length of 10 mm or more.

7. The multi-band patch antenna of claim 1, wherein the antenna pin has one or more bent portions formed on a region thereof, the region being exposed from a top of the base substrate.

8. The multi-band patch antenna of claim 1, wherein an end of the antenna pin, exposed from a top of the base substrate, is disposed at a position spaced apart from the center axis of the base substrate.

9. The multi-band patch antenna of claim 1, further comprising a metal plate disposed above the base substrate, wherein the metal plate is coupled to the end of the antenna pin, exposed from a top of the base substrate.

10. The multi-band patch antenna of claim 9, wherein the end of the antenna pin is coupled to a position spaced apart from the center axis of the metal plate.

11. The multi-band patch antenna of claim 9, wherein the metal plate is formed in a plate shape with a top surface, a bottom surface, and a side surface, and the end of the antenna pin is coupled to the side surface of the metal plate.

12. The multi-band patch antenna of claim 1, further comprising a second feed pin extending through the base substrate, wherein a virtual line connecting the first feed pin and the center point of the antenna pin and a virtual line connecting the second feed pin and the center point of the antenna pin are formed at a preset angle of 90 degrees therebetween, while crossing each other.

13. The multi-band patch antenna of claim 12, further comprising:

a third feed pin disposed so as to face the first feed pin with the antenna pin interposed therebetween, and extending through the base substrate; and a fourth feed pin disposed so as to face the second feed pin with the antenna pin interposed therebetween, and extending through the base substrate, wherein a virtual line connecting the first feed pin and the center point of the antenna pin and a virtual line connecting the third feed pin and the center point of the antenna pin are formed at a preset angle of 180 degrees therebetween, and the virtual line connecting the first feed pin and the center point of the antenna pin and a virtual line connecting the fourth feed pin and the center point of the antenna pin are formed at a preset angle of 270 degrees therebetween, while crossing each other.

14. The multi-band patch antenna of claim 1, further comprising:

another base substrate interposed between the base substrate and the lower patch; and a radiation patch interposed between the bottom surface of the base substrate and the top surface of the another base substrate, wherein the first and second through-holes extend through the base substrate and the another base substrate.

15. The multi-band patch antenna of claim 14, further comprising a second feed pin disposed on a virtual straight line connecting the first feed pin and the center point of the antenna pin, and extending through the base substrate and the another base substrate, wherein a virtual straight line connecting the first feed pin and the center point of the antenna pin and a virtual straight line connecting the second feed pin and the center point of the antenna pin are formed at a preset angle of 90 degrees therebetween, while crossing each other.

16. The multi-band patch antenna of claim 15, further comprising:

a third feed pin disposed so as to face the first feed pin with the antenna pin interposed therebetween, and extending through the base substrate and the another base substrate; and a fourth feed pin disposed so as to face the second feed pin with the antenna pin interposed therebetween, and extending through the base substrate and the another base substrate, wherein a virtual line connecting the first feed pin and the center point of the antenna pin and a virtual line connecting the third feed pin and the center point of the antenna pin are formed at a preset angle of 180 degrees therebetween, and the virtual line connecting the first feed pin and the center point of the antenna pin and a virtual line connecting the fourth feed pin and the center point of the antenna pin are formed at a preset angle of 270 degrees therebetween, while crossing each other.

17. The multi-band patch antenna of claim 14, further comprising a second feed pin disposed on a virtual straight line connecting the first feed pin and the center point of the antenna pin, and extending through the another base substrate, wherein the virtual straight line connecting the first feed pin and the center point of the antenna pin and a virtual straight line connecting the second feed pin and the center point of the antenna pin are formed at a preset angle of 180 degrees therebetween.

18. The multi-band patch antenna of claim 17, further comprising:

a third feed pin spaced apart from the first and second feed pins, and extending through the base substrate and the another base substrate; and a fourth feed pin spaced apart from the first and second feed pins, disposed so as to face the third feed pin with the antenna pin interposed therebetween, and extending through the another base substrate, wherein a virtual line connecting the third feed pin and the center point of the antenna pin and a virtual line connecting the fourth feed pin and the center point of the antenna pin are formed at a preset angle of 180 degrees therebetween.

19. The multi-band patch antenna of claim 18, wherein a virtual line connecting the first feed pin and the center point of the antenna pin and a virtual line connecting the third feed pin and the center point of the antenna pin are formed at a preset angle of 90 degrees therebetween, while crossing each other, wherein a virtual line connecting the second feed pin and the center point of the antenna pin and a virtual line connecting the fourth feed pin and the center point of the antenna pin are formed at a preset angle of 90 degrees therebetween, while crossing each other.

* * * * *